United States Patent [19]
McDonough

[11] Patent Number: 5,629,955
[45] Date of Patent: May 13, 1997

[54] VARIABLE SPECTRAL RESPONSE FIR FILTER AND FILTERING METHOD

[75] Inventor: John G. McDonough, San Diego, Calif.

[73] Assignee: Qualcomm Incorporated, San Diego, Calif.

[21] Appl. No.: 291,647

[22] Filed: Aug. 16, 1994

Related U.S. Application Data

[63] Continuation of Ser. No. 194,823, Feb. 14, 1994, which is a continuation of Ser. No. 846,312, Mar. 5, 1992, abandoned, which is a continuation-in-part of Ser. No. 543,496, Jun. 25, 1990, Pat. No. 5,103,459.

[51] Int. Cl.$^6$ .................. H04B 1/69; H04J 13/02; H04K 1/02; G06F 17/10
[52] U.S. Cl. .................. 375/200; 380/6; 380/34; 364/724.03; 364/724.13; 364/724.16; 364/724.19; 320/335
[58] Field of Search .................. 375/1, 200–210; 380/6, 34; 364/724.01–724.09, 724.1, 724.11–724.19, 724.2

[56] References Cited

U.S. PATENT DOCUMENTS

| | | |
|---|---|---|
| 4,047,013 | 9/1977 | Milewski .................. 364/724.02 |
| 4,066,881 | 1/1978 | Houdard .................. 364/724.17 X |
| 4,339,803 | 7/1982 | Michael et al. .................. 364/724.19 |
| 4,363,100 | 12/1982 | Agnew et al. .................. 364/724.08 X |
| 4,389,540 | 6/1983 | Nakamura et al. .................. 364/724.15 X |
| 4,399,536 | 8/1983 | Metz .................. 364/724.08 X |
| 4,691,293 | 9/1987 | Conboy .................. 364/724.16 |
| 4,805,129 | 2/1989 | David .................. 364/724.01 |
| 4,829,463 | 5/1989 | Kakishita et al. .................. 364/724.19 |
| 5,031,133 | 7/1991 | Sasaki .................. 364/724.16 |
| 5,262,970 | 11/1993 | Sevenhans et al. .................. 364/724.1 |
| 5,367,476 | 11/1994 | Elliott .................. 364/724.01 |
| 5,381,358 | 1/1995 | Sakamoto .................. 364/724.17 |

*Primary Examiner*—Bernarr E. Gregory
*Attorney, Agent, or Firm*—Russell B. Miller; Gregory D. Ogrod

[57] ABSTRACT

A method and system, for use in a communication system in which data is transmitted in data frames of predetermined time duration, for the positioning of the data within the data frames for transmission. A computation circuit computes according to the deterministic code a pseudorandom position for the data within each data frame. A positioning circuit positions the data within each data frame in the computed position.

39 Claims, 25 Drawing Sheets

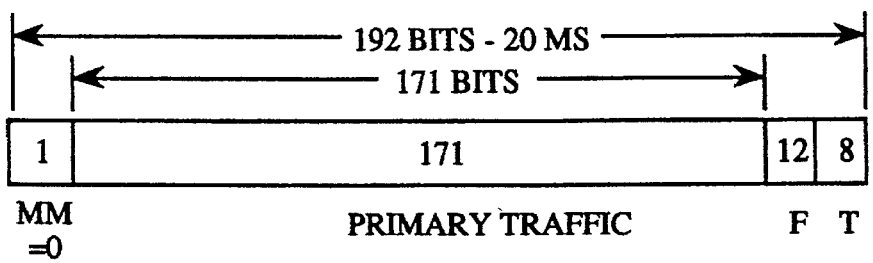
FIG. 2a PRIMARY TRAFFIC ONLY (9.6 KBPS)
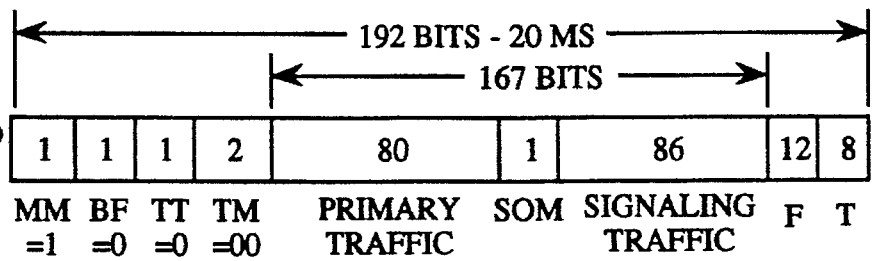
FIG. 2b DIM AND BURST WITH PRIMARY AND SIGNALING TRAFFIC (9.6 KBPS)
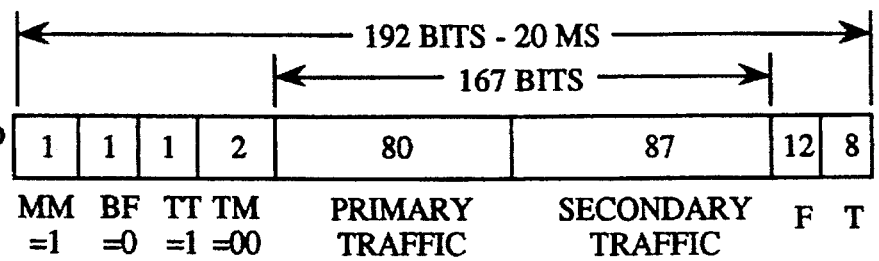
FIG. 2c DIM AND BURST WITH PRIMARY AND SECONDARY TRAFFIC (9.6 KBPS)
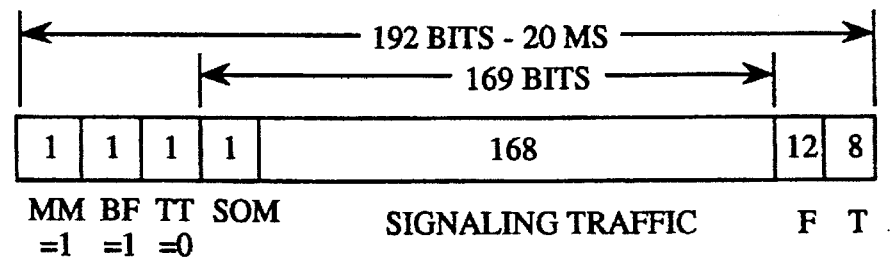
FIG. 2d BLANK AND BURST WITH SIGNALING TRAFFIC ONLY (9.6 KBPS)
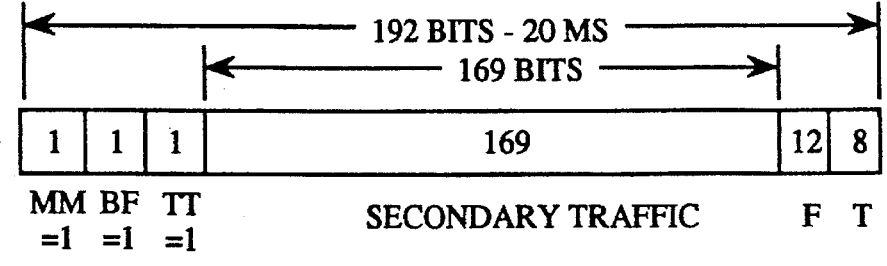
FIG. 2e BLANK AND BURST WITH SECONDARY TRAFFIC ONLY (9.6 KBPS)

4.8 KBPS FRAME FORMAT 2.4 KBPS FRAME FORMAT 1.2 KBPS FRAME FORMAT

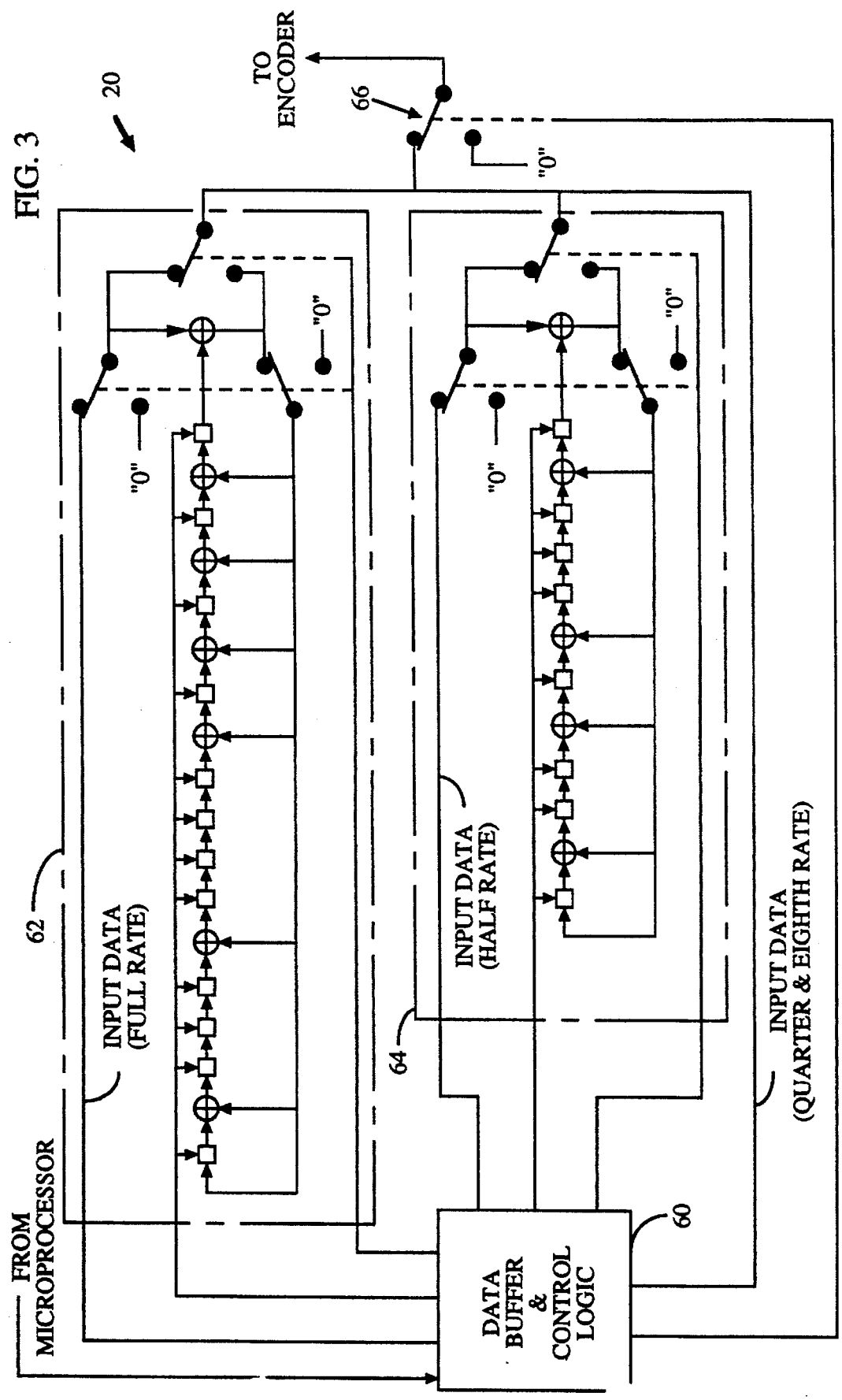

| | | | | | | | | | | | | | | | | | |
|---|---|---|---|---|---|---|---|---|---|---|---|---|---|---|---|---|---|
| 1 | 33 | 65 | 97 | 129 | 161 | 193 | 225 | 257 | 289 | 321 | 353 | 385 | 417 | 449 | 481 | 513 | 545 |
| 2 | 34 | 66 | 98 | 130 | 162 | 194 | 226 | 258 | 290 | 322 | 354 | 386 | 418 | 450 | 482 | 514 | 546 |
| 3 | 35 | 67 | 99 | 131 | 163 | 195 | 227 | 259 | 291 | 323 | 355 | 387 | 419 | 451 | 483 | 515 | 547 |
| 4 | 36 | 68 | 100 | 132 | 164 | 196 | 228 | 260 | 292 | 324 | 356 | 388 | 420 | 452 | 484 | 516 | 548 |
| 5 | 37 | 69 | 101 | 133 | 165 | 197 | 229 | 261 | 293 | 325 | 357 | 389 | 421 | 453 | 485 | 517 | 549 |
| 6 | 38 | 70 | 102 | 134 | 166 | 198 | 230 | 262 | 294 | 326 | 358 | 390 | 422 | 454 | 486 | 518 | 550 |
| 7 | 39 | 71 | 103 | 135 | 167 | 199 | 231 | 263 | 295 | 327 | 359 | 391 | 423 | 455 | 487 | 519 | 551 |
| 8 | 40 | 72 | 104 | 136 | 168 | 200 | 232 | 264 | 296 | 328 | 360 | 392 | 424 | 456 | 488 | 520 | 552 |
| 9 | 41 | 73 | 105 | 137 | 169 | 201 | 233 | 265 | 297 | 329 | 361 | 393 | 425 | 457 | 489 | 521 | 553 |
| 10 | 42 | 74 | 106 | 138 | 170 | 202 | 234 | 266 | 298 | 330 | 362 | 394 | 426 | 458 | 490 | 522 | 554 |
| 11 | 43 | 75 | 107 | 139 | 171 | 203 | 235 | 267 | 299 | 331 | 363 | 395 | 427 | 459 | 491 | 523 | 555 |
| 12 | 44 | 76 | 108 | 140 | 172 | 204 | 236 | 268 | 300 | 332 | 364 | 396 | 428 | 460 | 492 | 524 | 556 |
| 13 | 45 | 77 | 109 | 141 | 173 | 205 | 237 | 269 | 301 | 333 | 365 | 397 | 429 | 461 | 493 | 525 | 557 |
| 14 | 46 | 78 | 110 | 142 | 174 | 206 | 238 | 270 | 302 | 334 | 366 | 398 | 430 | 462 | 494 | 526 | 558 |
| 15 | 47 | 79 | 111 | 143 | 175 | 207 | 239 | 271 | 303 | 335 | 367 | 399 | 431 | 463 | 495 | 527 | 559 |
| 16 | 48 | 80 | 112 | 144 | 176 | 208 | 240 | 272 | 304 | 336 | 368 | 400 | 432 | 464 | 496 | 528 | 560 |
| 17 | 49 | 81 | 113 | 145 | 177 | 209 | 241 | 273 | 305 | 337 | 369 | 401 | 433 | 465 | 497 | 529 | 561 |
| 18 | 50 | 82 | 114 | 146 | 178 | 210 | 242 | 274 | 306 | 338 | 370 | 402 | 434 | 466 | 498 | 530 | 562 |
| 19 | 51 | 83 | 115 | 147 | 179 | 211 | 243 | 275 | 307 | 339 | 371 | 403 | 435 | 467 | 499 | 531 | 563 |
| 20 | 52 | 84 | 116 | 148 | 180 | 212 | 244 | 276 | 308 | 340 | 372 | 404 | 436 | 468 | 500 | 532 | 564 |
| 21 | 53 | 85 | 117 | 149 | 181 | 213 | 245 | 277 | 309 | 341 | 373 | 405 | 437 | 469 | 501 | 533 | 565 |
| 22 | 54 | 86 | 118 | 150 | 182 | 214 | 246 | 278 | 310 | 342 | 374 | 406 | 438 | 470 | 502 | 534 | 566 |
| 23 | 55 | 87 | 119 | 151 | 183 | 215 | 247 | 279 | 311 | 343 | 375 | 407 | 439 | 471 | 503 | 535 | 567 |
| 24 | 56 | 88 | 120 | 152 | 184 | 216 | 248 | 280 | 312 | 344 | 376 | 408 | 440 | 472 | 504 | 536 | 568 |
| 25 | 57 | 89 | 121 | 153 | 185 | 217 | 249 | 281 | 313 | 345 | 377 | 409 | 441 | 473 | 505 | 537 | 569 |
| 26 | 58 | 90 | 122 | 154 | 186 | 218 | 250 | 282 | 314 | 346 | 378 | 410 | 442 | 474 | 506 | 538 | 570 |
| 27 | 59 | 91 | 123 | 155 | 187 | 219 | 251 | 283 | 315 | 347 | 379 | 411 | 443 | 475 | 507 | 539 | 571 |
| 28 | 60 | 92 | 124 | 156 | 188 | 220 | 252 | 284 | 316 | 348 | 380 | 412 | 444 | 476 | 508 | 540 | 572 |
| 29 | 61 | 93 | 125 | 157 | 189 | 221 | 253 | 285 | 317 | 349 | 381 | 413 | 445 | 477 | 509 | 541 | 573 |
| 30 | 62 | 94 | 126 | 158 | 190 | 222 | 254 | 286 | 318 | 350 | 382 | 414 | 446 | 478 | 510 | 542 | 574 |
| 31 | 63 | 95 | 127 | 159 | 191 | 223 | 255 | 287 | 319 | 351 | 383 | 415 | 447 | 479 | 511 | 543 | 575 |
| 32 | 64 | 96 | 128 | 160 | 192 | 224 | 256 | 288 | 320 | 352 | 384 | 416 | 448 | 480 | 512 | 544 | 576 |

FIG. 5a

| | | | | | | | | | | | | | | | | | |
|---|---|---|---|---|---|---|---|---|---|---|---|---|---|---|---|---|---|
| 1 | 17 | 33 | 49 | 65 | 81 | 97 | 113 | 129 | 145 | 161 | 177 | 193 | 209 | 225 | 241 | 257 | 273 |
| 1 | 17 | 33 | 49 | 65 | 81 | 97 | 113 | 129 | 145 | 161 | 177 | 193 | 209 | 225 | 241 | 257 | 273 |
| 2 | 18 | 34 | 50 | 66 | 82 | 98 | 114 | 130 | 146 | 162 | 178 | 194 | 210 | 226 | 242 | 258 | 274 |
| 2 | 18 | 34 | 50 | 66 | 82 | 98 | 114 | 130 | 146 | 162 | 178 | 194 | 210 | 226 | 242 | 258 | 274 |
| 3 | 19 | 35 | 51 | 67 | 83 | 99 | 115 | 131 | 147 | 163 | 179 | 195 | 211 | 227 | 243 | 259 | 275 |
| 3 | 19 | 35 | 51 | 67 | 83 | 99 | 115 | 131 | 147 | 163 | 179 | 195 | 211 | 227 | 243 | 259 | 275 |
| 4 | 20 | 36 | 52 | 68 | 84 | 100 | 116 | 132 | 148 | 164 | 180 | 196 | 212 | 228 | 244 | 260 | 276 |
| 4 | 20 | 36 | 52 | 68 | 84 | 100 | 116 | 132 | 148 | 164 | 180 | 196 | 212 | 228 | 244 | 260 | 276 |
| 5 | 21 | 37 | 53 | 69 | 85 | 101 | 117 | 133 | 149 | 165 | 181 | 197 | 213 | 229 | 245 | 261 | 277 |
| 5 | 21 | 37 | 53 | 69 | 85 | 101 | 117 | 133 | 149 | 165 | 181 | 197 | 213 | 229 | 245 | 261 | 277 |
| 6 | 22 | 38 | 54 | 70 | 86 | 102 | 118 | 134 | 150 | 166 | 182 | 198 | 214 | 230 | 246 | 262 | 278 |
| 6 | 22 | 38 | 54 | 70 | 86 | 102 | 118 | 134 | 150 | 166 | 182 | 198 | 214 | 230 | 246 | 262 | 278 |
| 7 | 23 | 39 | 55 | 71 | 87 | 103 | 119 | 135 | 151 | 167 | 183 | 199 | 215 | 231 | 247 | 263 | 279 |
| 7 | 23 | 39 | 55 | 71 | 87 | 103 | 119 | 135 | 151 | 167 | 183 | 199 | 215 | 231 | 247 | 263 | 279 |
| 8 | 24 | 40 | 56 | 72 | 88 | 104 | 120 | 136 | 152 | 168 | 184 | 200 | 216 | 232 | 248 | 264 | 280 |
| 8 | 24 | 40 | 56 | 72 | 88 | 104 | 120 | 136 | 152 | 168 | 184 | 200 | 216 | 232 | 248 | 264 | 280 |
| 9 | 25 | 41 | 57 | 73 | 89 | 105 | 121 | 137 | 153 | 169 | 185 | 201 | 217 | 233 | 249 | 265 | 281 |
| 9 | 25 | 41 | 57 | 73 | 89 | 105 | 121 | 137 | 153 | 169 | 185 | 201 | 217 | 233 | 249 | 265 | 281 |
| 10 | 26 | 42 | 58 | 74 | 90 | 106 | 122 | 138 | 154 | 170 | 186 | 202 | 218 | 234 | 250 | 266 | 282 |
| 10 | 26 | 42 | 58 | 74 | 90 | 106 | 122 | 138 | 154 | 170 | 186 | 202 | 218 | 234 | 250 | 266 | 282 |
| 11 | 27 | 43 | 59 | 75 | 91 | 107 | 123 | 139 | 155 | 171 | 187 | 203 | 219 | 235 | 251 | 267 | 283 |
| 11 | 27 | 43 | 59 | 75 | 91 | 107 | 123 | 139 | 155 | 171 | 187 | 203 | 219 | 235 | 251 | 267 | 283 |
| 12 | 28 | 44 | 60 | 76 | 92 | 108 | 124 | 140 | 156 | 172 | 188 | 204 | 220 | 236 | 252 | 268 | 284 |
| 12 | 28 | 44 | 60 | 76 | 92 | 108 | 124 | 140 | 156 | 172 | 188 | 204 | 220 | 236 | 252 | 268 | 284 |
| 13 | 29 | 45 | 61 | 77 | 93 | 109 | 125 | 141 | 157 | 173 | 189 | 205 | 221 | 237 | 253 | 269 | 285 |
| 13 | 29 | 45 | 61 | 77 | 93 | 109 | 125 | 141 | 157 | 173 | 189 | 205 | 221 | 237 | 253 | 269 | 285 |
| 14 | 30 | 46 | 62 | 78 | 94 | 110 | 126 | 142 | 158 | 174 | 190 | 206 | 222 | 238 | 254 | 270 | 286 |
| 14 | 30 | 46 | 62 | 78 | 94 | 110 | 126 | 142 | 158 | 174 | 190 | 206 | 222 | 238 | 254 | 270 | 286 |
| 15 | 31 | 47 | 63 | 79 | 95 | 111 | 127 | 143 | 159 | 175 | 191 | 207 | 223 | 239 | 255 | 271 | 287 |
| 15 | 31 | 47 | 63 | 79 | 95 | 111 | 127 | 143 | 159 | 175 | 191 | 207 | 223 | 239 | 255 | 271 | 287 |
| 16 | 32 | 48 | 64 | 80 | 96 | 112 | 128 | 144 | 160 | 176 | 192 | 208 | 224 | 240 | 256 | 272 | 288 |
| 16 | 32 | 48 | 64 | 80 | 96 | 112 | 128 | 144 | 160 | 176 | 192 | 208 | 224 | 240 | 256 | 272 | 288 |

FIG. 5b

| | | | | | | | | | | | | | | | | | |
|---|---|---|---|---|---|---|---|---|---|---|---|---|---|---|---|---|---|
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |

FIG. 5c

| 1 | 5 | 9  | 13 | 17 | 21 | 25 | 29 | 33 | 37 | 41 | 45 | 49 | 53 | 57 | 61 | 65 | 69 |
|---|---|----|----|----|----|----|----|----|----|----|----|----|----|----|----|----|----|
| 1 | 5 | 9  | 13 | 17 | 21 | 25 | 29 | 33 | 37 | 41 | 45 | 49 | 53 | 57 | 61 | 65 | 69 |
| 1 | 5 | 9  | 13 | 17 | 21 | 25 | 29 | 33 | 37 | 41 | 45 | 49 | 53 | 57 | 61 | 65 | 69 |
| 1 | 5 | 9  | 13 | 17 | 21 | 25 | 29 | 33 | 37 | 41 | 45 | 49 | 53 | 57 | 61 | 65 | 69 |
| 1 | 5 | 9  | 13 | 17 | 21 | 25 | 29 | 33 | 37 | 41 | 45 | 49 | 53 | 57 | 61 | 65 | 69 |
| 1 | 5 | 9  | 13 | 17 | 21 | 25 | 29 | 33 | 37 | 41 | 45 | 49 | 53 | 57 | 61 | 65 | 69 |
| 1 | 5 | 9  | 13 | 17 | 21 | 25 | 29 | 33 | 37 | 41 | 45 | 49 | 53 | 57 | 61 | 65 | 69 |
| 1 | 5 | 9  | 13 | 17 | 21 | 25 | 29 | 33 | 37 | 41 | 45 | 49 | 53 | 57 | 61 | 65 | 69 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |

WALSH CHIP WITHIN SYMBOL

| WALSH SYMBOL INDEX | 0000 0123 | 0000 4567 | 1111 8901 | 1111 2345 | 1111 6789 | 2222 0123 | 2222 4567 | 2222 8901 | 3333 2345 | 3333 6789 | 4444 0123 | 4444 4567 | 4455 8901 | 5555 2345 | 5555 6789 | 6666 0123 |
|---|---|---|---|---|---|---|---|---|---|---|---|---|---|---|---|---|
| 0  | 0000 | 0000 | 0000 | 0000 | 0000 | 0000 | 0000 | 0000 | 0000 | 0000 | 0000 | 0000 | 0000 | 0000 | 0000 | 0000 |
| 1  | 0101 | 0101 | 0101 | 0101 | 0101 | 0101 | 0101 | 0101 | 0101 | 0101 | 0101 | 0101 | 0101 | 0101 | 0101 | 0101 |
| 2  | 0011 | 0011 | 0011 | 0011 | 0011 | 0011 | 0011 | 0011 | 0011 | 0011 | 0011 | 0011 | 0011 | 0011 | 0011 | 0011 |
| 3  | 0110 | 0110 | 0110 | 0110 | 0110 | 0110 | 0110 | 0110 | 0110 | 0110 | 0110 | 0110 | 0110 | 0110 | 0110 | 0110 |
| 4  | 0000 | 1111 | 0000 | 1111 | 0000 | 1111 | 0000 | 1111 | 0000 | 1111 | 0000 | 1111 | 0000 | 1111 | 0000 | 1111 |
| 5  | 0101 | 1010 | 0101 | 1010 | 0101 | 1010 | 0101 | 1010 | 0101 | 1010 | 0101 | 1010 | 0101 | 1010 | 0101 | 1010 |
| 6  | 0011 | 1100 | 0011 | 1100 | 0011 | 1100 | 0011 | 1100 | 0011 | 1100 | 0011 | 1100 | 0011 | 1100 | 0011 | 1100 |
| 7  | 0110 | 1001 | 0110 | 1001 | 0110 | 1001 | 0110 | 1001 | 0110 | 1001 | 0110 | 1001 | 0110 | 1001 | 0110 | 1001 |
| 8  | 0000 | 0000 | 1111 | 1111 | 0000 | 0000 | 1111 | 1111 | 0000 | 0000 | 1111 | 1111 | 0000 | 0000 | 1111 | 1111 |
| 9  | 0101 | 0101 | 1010 | 1010 | 0101 | 0101 | 1010 | 1010 | 0101 | 0101 | 1010 | 1010 | 0101 | 0101 | 1010 | 1010 |
| 10 | 0011 | 0011 | 1100 | 1100 | 0011 | 0011 | 1100 | 1100 | 0011 | 0011 | 1100 | 1100 | 0011 | 0011 | 1100 | 1100 |
| 11 | 0110 | 0110 | 1001 | 1001 | 0110 | 0110 | 1001 | 1001 | 0110 | 0110 | 1001 | 1001 | 0110 | 0110 | 1001 | 1001 |
| 12 | 0000 | 1111 | 1111 | 0000 | 0000 | 1111 | 1111 | 0000 | 0000 | 1111 | 1111 | 0000 | 0000 | 1111 | 1111 | 0000 |
| 13 | 0101 | 1010 | 1010 | 0101 | 0101 | 1010 | 1010 | 0101 | 0101 | 1010 | 1010 | 0101 | 0101 | 1010 | 1010 | 0101 |
| 14 | 0011 | 1100 | 1100 | 0011 | 0011 | 1100 | 1100 | 0011 | 0011 | 1100 | 1100 | 0011 | 0011 | 1100 | 1100 | 0011 |
| 15 | 0110 | 1001 | 1001 | 0110 | 0110 | 1001 | 1001 | 0110 | 0110 | 1001 | 1001 | 0110 | 0110 | 1001 | 1001 | 0110 |
| 16 | 0000 | 0000 | 0000 | 0000 | 1111 | 1111 | 1111 | 1111 | 0000 | 0000 | 0000 | 0000 | 1111 | 1111 | 1111 | 1111 |
| 17 | 0101 | 0101 | 0101 | 0101 | 1010 | 1010 | 1010 | 1010 | 0101 | 0101 | 0101 | 0101 | 1010 | 1010 | 1010 | 1010 |
| 18 | 0011 | 0011 | 0011 | 0011 | 1100 | 1100 | 1100 | 1100 | 0011 | 0011 | 0011 | 0011 | 1100 | 1100 | 1100 | 1100 |
| 19 | 0110 | 0110 | 0110 | 0110 | 1001 | 1001 | 1001 | 1001 | 0110 | 0110 | 0110 | 0110 | 1001 | 1001 | 1001 | 1001 |
| 20 | 0000 | 1111 | 0000 | 1111 | 1111 | 0000 | 1111 | 0000 | 0000 | 1111 | 0000 | 1111 | 1111 | 0000 | 1111 | 0000 |
| 21 | 0101 | 1010 | 0101 | 1010 | 1010 | 0101 | 1010 | 0101 | 0101 | 1010 | 0101 | 1010 | 1010 | 0101 | 1010 | 0101 |
| 22 | 0011 | 1100 | 0011 | 1100 | 1100 | 0011 | 1100 | 0011 | 0011 | 1100 | 0011 | 1100 | 1100 | 0011 | 1100 | 0011 |
| 23 | 0110 | 1001 | 0110 | 1001 | 1001 | 0110 | 1001 | 0110 | 0110 | 1001 | 0110 | 1001 | 1001 | 0110 | 1001 | 0110 |

FIG. 6b

| WALSH SYMBOL INDEX | WALSH CHIP WITHIN SYMBOL | | | | | | | | | | | | | | | |
|---|---|---|---|---|---|---|---|---|---|---|---|---|---|---|---|---|
| | 0123 | 4567 | 11 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
| 24 | 0000 | 0000 | 1111 | 1111 | 1111 | 1111 | 0000 | 0000 | 0000 | 0000 | 1111 | 1111 | 1111 | 1111 | 0000 | 0000 |
| 25 | 0101 | 0101 | 1010 | 1010 | 1010 | 1010 | 0101 | 0101 | 0101 | 0101 | 1010 | 1010 | 1010 | 1010 | 0101 | 0101 |
| 26 | 0011 | 0011 | 1100 | 1100 | 1100 | 1100 | 0011 | 0011 | 0011 | 0011 | 1100 | 1100 | 1100 | 1100 | 0011 | 0011 |
| 27 | 0110 | 0110 | 1001 | 1001 | 1001 | 1001 | 0110 | 0110 | 0110 | 0110 | 1001 | 1001 | 1001 | 1001 | 0110 | 0110 |
| 28 | 0000 | 1111 | 1111 | 0000 | 1111 | 0000 | 0000 | 1111 | 0000 | 1111 | 1111 | 0000 | 1111 | 0000 | 0000 | 1111 |
| 29 | 0101 | 1010 | 1010 | 0101 | 1010 | 0101 | 0101 | 1010 | 0101 | 1010 | 1010 | 0101 | 1010 | 0101 | 0101 | 1010 |
| 30 | 0011 | 1100 | 1100 | 0011 | 1100 | 0011 | 0011 | 1100 | 0011 | 1100 | 1100 | 0011 | 1100 | 0011 | 0011 | 1100 |
| 31 | 0110 | 1001 | 1001 | 0110 | 1001 | 0110 | 0110 | 1001 | 0110 | 1001 | 1001 | 0110 | 1001 | 0110 | 0110 | 1001 |
| 32 | 0000 | 0000 | 0000 | 0000 | 0000 | 0000 | 0000 | 0000 | 1111 | 1111 | 1111 | 1111 | 1111 | 1111 | 1111 | 1111 |
| 33 | 0101 | 0101 | 0101 | 0101 | 0101 | 0101 | 0101 | 0101 | 1010 | 1010 | 1010 | 1010 | 1010 | 1010 | 1010 | 1010 |
| 34 | 0011 | 0011 | 0011 | 0011 | 0011 | 0011 | 0011 | 0011 | 1100 | 1100 | 1100 | 1100 | 1100 | 1100 | 1100 | 1100 |
| 35 | 0110 | 0110 | 0110 | 0110 | 0110 | 0110 | 0110 | 0110 | 1001 | 1001 | 1001 | 1001 | 1001 | 1001 | 1001 | 1001 |
| 36 | 0000 | 1111 | 0000 | 1111 | 0000 | 1111 | 0000 | 1111 | 1111 | 0000 | 1111 | 0000 | 1111 | 0000 | 1111 | 0000 |
| 37 | 0101 | 1010 | 0101 | 1010 | 0101 | 1010 | 0101 | 1010 | 1010 | 0101 | 1010 | 0101 | 1010 | 0101 | 1010 | 0101 |
| 38 | 0011 | 1100 | 0011 | 1100 | 0011 | 1100 | 0011 | 1100 | 1100 | 0011 | 1100 | 0011 | 1100 | 0011 | 1100 | 0011 |
| 39 | 0110 | 1001 | 0110 | 1001 | 0110 | 1001 | 0110 | 1001 | 1001 | 0110 | 1001 | 0110 | 1001 | 0110 | 1001 | 0110 |
| 40 | 0000 | 0000 | 1111 | 1111 | 0000 | 0000 | 1111 | 1111 | 1111 | 1111 | 0000 | 0000 | 1111 | 1111 | 0000 | 0000 |
| 41 | 0101 | 0101 | 1010 | 1010 | 0101 | 0101 | 1010 | 1010 | 1010 | 1010 | 0101 | 0101 | 1010 | 1010 | 0101 | 0101 |
| 42 | 0011 | 0011 | 1100 | 1100 | 0011 | 0011 | 1100 | 1100 | 1100 | 1100 | 0011 | 0011 | 1100 | 1100 | 0011 | 0011 |
| 43 | 0110 | 0110 | 1001 | 1001 | 0110 | 0110 | 1001 | 1001 | 1001 | 1001 | 0110 | 0110 | 1001 | 1001 | 0110 | 0110 |
| 44 | 0000 | 1111 | 1111 | 0000 | 0000 | 1111 | 1111 | 0000 | 1111 | 0000 | 0000 | 1111 | 1111 | 0000 | 0000 | 1111 |
| 45 | 0101 | 1010 | 1010 | 0101 | 0101 | 1010 | 1010 | 0101 | 1010 | 0101 | 0101 | 1010 | 1010 | 0101 | 0101 | 1010 |
| 46 | 0011 | 1100 | 1100 | 0011 | 0011 | 1100 | 1100 | 0011 | 1100 | 0011 | 0011 | 1100 | 1100 | 0011 | 0011 | 1100 |
| 47 | 0110 | 1001 | 1001 | 0110 | 0110 | 1001 | 1001 | 0110 | 1001 | 0110 | 0110 | 1001 | 1001 | 0110 | 0110 | 1001 |

FIG. 6c

| WALSH SYMBOL INDEX | WALSH CHIP WITHIN SYMBOL | | | | | | | | | | | | | | | |
|---|---|---|---|---|---|---|---|---|---|---|---|---|---|---|---|---|
| | 0123 | 4567 | 11<br>8901 | 1111<br>2345 | 1111<br>6789 | 2222<br>0123 | 2222<br>4567 | 2233<br>8901 | 3333<br>2345 | 3333<br>6789 | 4444<br>0123 | 4444<br>4567 | 4455<br>8901 | 5555<br>2345 | 5555<br>6789 | 6666<br>0123 |
| 48 | 0000 | 0000 | 0000 | 0000 | 1111 | 1111 | 1111 | 1111 | 1111 | 1111 | 1111 | 1111 | 0000 | 0000 | 0000 | 0000 |
| 49 | 0101 | 0101 | 0101 | 0101 | 1010 | 1010 | 1010 | 1010 | 1010 | 1010 | 1010 | 1010 | 0101 | 0101 | 0101 | 0101 |
| 50 | 0011 | 0011 | 0011 | 0011 | 1100 | 1100 | 1100 | 1100 | 1100 | 1100 | 1100 | 1100 | 0011 | 0011 | 0011 | 0011 |
| 51 | 0110 | 0110 | 0110 | 0110 | 1001 | 1001 | 1001 | 1001 | 1001 | 1001 | 1001 | 1001 | 0110 | 0110 | 0110 | 0110 |
| 52 | 0000 | 1111 | 0000 | 1111 | 1111 | 0000 | 1111 | 0000 | 1111 | 0000 | 1111 | 0000 | 0000 | 1111 | 0000 | 1111 |
| 53 | 0101 | 1010 | 0101 | 1010 | 1010 | 0101 | 1010 | 0101 | 1010 | 0101 | 1010 | 0101 | 0101 | 1010 | 0101 | 1010 |
| 54 | 0011 | 1100 | 0011 | 1100 | 1100 | 0011 | 1100 | 0011 | 1100 | 0011 | 1100 | 0011 | 0011 | 1100 | 0011 | 1100 |
| 55 | 0110 | 1001 | 0110 | 1001 | 1001 | 0110 | 1001 | 0110 | 1001 | 0110 | 1001 | 0110 | 0110 | 1001 | 0110 | 1001 |
| 56 | 0000 | 0000 | 1111 | 1111 | 1111 | 1111 | 0000 | 0000 | 1111 | 1111 | 0000 | 0000 | 0000 | 0000 | 1111 | 1111 |
| 57 | 0101 | 0101 | 1010 | 1010 | 1010 | 1010 | 0101 | 0101 | 1010 | 1010 | 0101 | 0101 | 0101 | 0101 | 1010 | 1010 |
| 58 | 0011 | 0011 | 1100 | 1100 | 1100 | 1100 | 0011 | 0011 | 1100 | 1100 | 0011 | 0011 | 0011 | 0011 | 1100 | 1100 |
| 59 | 0110 | 0110 | 1001 | 1001 | 1001 | 1001 | 0110 | 0110 | 1001 | 1001 | 0110 | 0110 | 0110 | 0110 | 1001 | 1001 |
| 60 | 0000 | 1111 | 1111 | 0000 | 1111 | 0000 | 0000 | 1111 | 1111 | 0000 | 0000 | 1111 | 0000 | 1111 | 1111 | 0000 |
| 61 | 0101 | 1010 | 1010 | 0101 | 1010 | 0101 | 0101 | 1010 | 1010 | 0101 | 0101 | 1010 | 0101 | 1010 | 1010 | 0101 |
| 62 | 0011 | 1100 | 1100 | 0011 | 1100 | 0011 | 0011 | 1100 | 1100 | 0011 | 0011 | 1100 | 0011 | 1100 | 1100 | 0011 |
| 63 | 0110 | 1001 | 1001 | 0110 | 1001 | 0110 | 0110 | 1001 | 1001 | 0110 | 0110 | 1001 | 0110 | 1001 | 1001 | 0110 |

ACCESS CHANNEL LONG CODE MASK

PUBLIC LONG CODE MASK

PRIVATE LONG CODE MASK

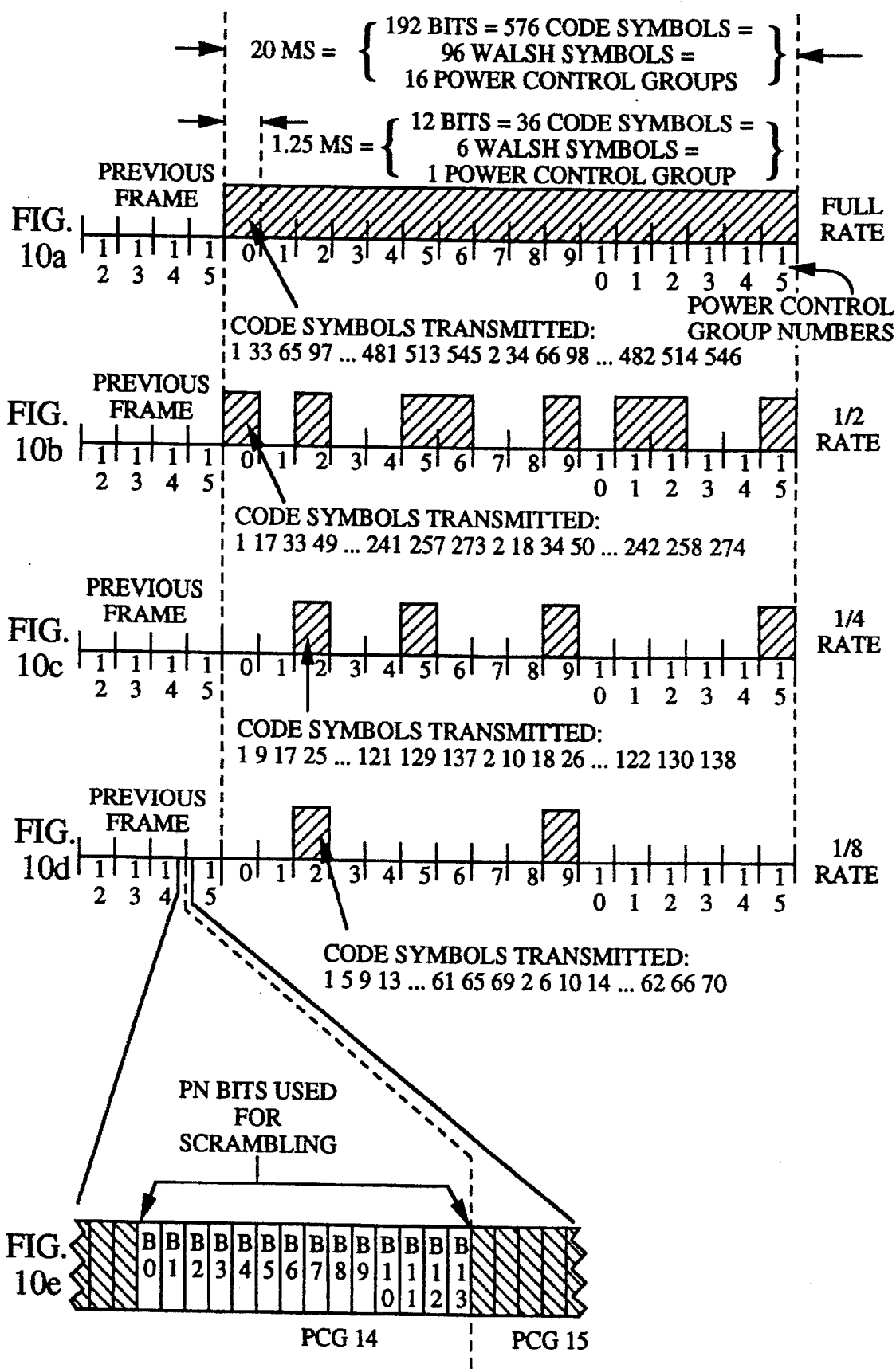

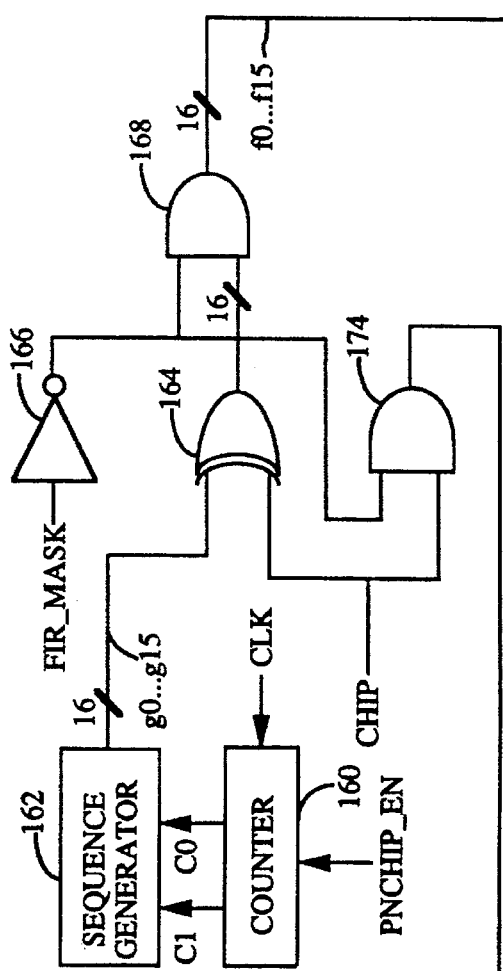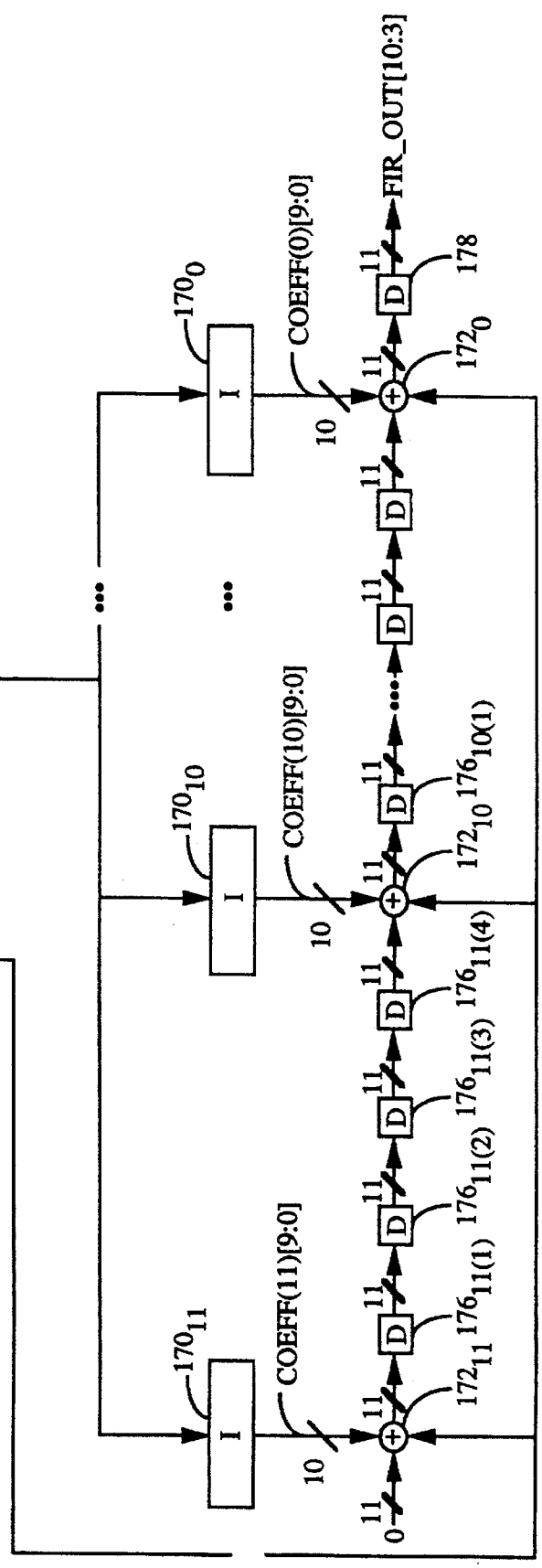
FIG. 14

VARIABLE SPECTRAL RESPONSE FIR FILTER AND FILTERING METHOD

BACKGROUND OF THE INVENTION

I. Field of the Invention

The present invention is a continuation application of copending U.S. patent application Ser. No. 08/194,823, filed Feb. 14, 1994, which is a continuation application of U.S. patent application Ser. No. 07/846,312, filed Mar. 5,1992, now abandoned, entitled "DATA BURST RANDOMIZER" which is a continuation-in-part application of U.S. patent application Ser. No. 07/543,496, filed Jun. 25, 1990, entitled "SYSTEM AND METHOD FOR GENERATING SIGNAL WAVEFORMS IN A CDMA CELLULAR TELEPHONE SYSTEM", now U.S. Pat. No. 5,103,459 and as such relates to data transmission. More particularly, the present invention relates to a novel and improved method and apparatus for the random positioning of data within transmission data frames.

II. General Background of the Invention

In the field of digital communications it is well known that data may be transmitted in frames of a constant time duration and number of data bits. However in certain types of digital communication systems, it is desirable to transmit less data than is contained in a full frame of data. One such digital communication system is a Code Division Multiple Access (CDMA) communication system which uses direct sequence spectrum spreading techniques.

In a CDMA system, system capacity is limited by the total interference within the transmission frequency band. Within the frequency band of interest transmitted signals intended for one user interfere with the signals of other users. It is this mutual interference which limits the capacity of the system to support an increased number of system users, as compared to conventional analog systems. In using fixed length data frames which are completely filled with data a constant level of interference is caused by the transmission. Although the level of transmission power for a user may be adjusted to control the interference this user's signal causes to other users, a reduction in transmitter power below a certain point can degrade the quality of this user's communication link. It is therefore desirable to provide for the CDMA system techniques which can reduce the user interference levels even further, thereby increasing system capacity.

The use of variable rate vocoding techniques provides the ability to reduce the amount of information representative of the speech as compared to fixed rate vocoding techniques. Thus by using variable rate vocoding techniques less data need be transmitted. Variable rate vocoded data may be adapted to be transmitted using data frames of a fixed time duration. For vocoding rates which provide data at lower data rates for a data frame that is of a time duration designed for higher rate data, redundancy in the frame data may be provided to support a transmission of data throughout the entire frame. Thus for a frame in which the data rate is less than full, the data bits and repeats thereof may be transmitted within the frame. Like before, the constant transmission of data frames containing redundant data provides a constant level of interference even though these frames contain lesser amounts of useful information, i.e. information in a lower data rate frame. However depending upon the amount of redundancy in the frame, the power in the transmitted data may be reduced accordingly. For data frames in which the data is repeated the power used to transit the data may be reduced. This technique provides for a reduction in the level of interference caused by this system user, so as to realize an increase in system user capacity.

As mentioned previously, variable rate vocoding provides a communication system with the ability to transmit lesser amounts of data representative of the voice information as compared to one which uses fixed rate vocoding. In transmitting less data a reduction in transmitted energy is realized. Variable rate vocoding as implemented in a CDMA communication system can therefore result in a reduction in the level of interference caused by a system user. In order to take full advantage of variable rate vocoding in a transmission scheme in which data frames are of a fixed time duration, data without any redundancy may be transmitted for the frame. In addition, power control techniques may be implemented to attenuate the transmitted signal to further reduce system interference and still maintain quality communications.

In such a communication system, variable rate vocoder data, or non-vocoder data, or a combination thereof may be transmitted on a frame by frame basis. For the less than full rate data frames, the one set of data to be transmitted for a frame may be simply placed at the beginning of a frame or another predetermined fixed position within the frame. However in a system where user transmission frames are synchronized to system timing, disregarding propagation delays, the use of such a simple positioning scheme may still result in unnecessary overlap in the transmission of data by the various users. The unnecessary overlap in transmission effectively increases the level of system interference as compared to the case where no overlap occurs.

It is therefore an object of the present invention to reduce in a CDMA communication system user mutual interference so as to provide an increase in user capacity.

It is yet another object of the present invention to provide for the transmission of frames of data so as to reduce, on a frame by frame basis, systemwide traffic load.

It is still a further object of the present invention to provide a novel and improved method and apparatus for pseudorandomly positioning data within a data frame for transmission.

SUMMARY OF THE INVENTION

The present invention is a novel and improved method and system for the communication of frames of data in a manner which reduces within transmission data frames of various users the occurrence of unnecessary instances of contemporaneous transmission of data so as to reduce systemwide traffic loading in data transmission.

In accordance with the present invention, data is transmitted in data frames of a fixed time duration. When data is provided for transmission at a data rate less than the data flames are capable of supporting, the data is pseudorandomly distributed throughout the data frame. The distribution of the data throughout the frame reduces the possibility of concurrent transmission by other users whose frame timing is approximately the same. In an alternative implementation, where less than full rate data is provided for a frame, data is repeated within the frame to provide a full frame of data. When the frame contains repeated data the frame is transmitted at a lower power level according to the amount of data redundancy employed for the frame.

The present invention is thus a method and system, for use in a communication system in which data is transmitted in data frames of a predetermined time duration which allows for the positioning of data within the data frames for transmission. A computation circuit computes according to a deterministic code a pseudorandom position for the data within each data frame. A positioning circuit positions the data within each data frame for transmission according to the computed position.

In one implementation, the data for each frame is provided at a selected one of a plurality of data rates with the data provided at each rate comprised of an ordered sequence of a first version of data bits and R repeated versions of the data bits, where R is an integer. The computation circuit is further responsive to a data rate indication for selecting a set of algorithms from a plurality of algorithm sets wherein each algorithm set corresponds to a predetermined data rate. The computation circuit computes the data position for each frame from the selected algorithm set and the deterministic code. The positioning circuit deletes from each frame of data in accordance with the computed data position selected ones of the ordered sequence of the first version and R repeated versions of the data bits, all except one version of the first and R repeated versions of the data bits so as to provide an output of only one of the first version and R repeated versions of the data bits in the selected data position.

In an alternative implementation the data for each frame is provided at a selected one of a plurality of data rates with the data provided at each rate comprised of an ordered sequence of a first version of data bits and R repeated versions of the data bits. A rate indication is used to scale the power level of transmission of the frame of the first version of data bits and the R repeated versions of the data bits.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 2a–2h are a series of diagrams illustrating frame data formats for the various data rates, types and modes;

FIG. 3 is a diagram illustrating an exemplary circuit implementation of the CRC and Tail Bit generator of FIG. 1;

FIGS. 5a–5d illustrate in a series of charts the ordering of code symbols in the interleaver array for transmission data rates of 9.6, 4.8, 2.4 and 1.2 kbps, respectively;

FIGS. 6a–6c are a series of charts illustrating the Walsh symbols corresponding to each encoder symbol group;

FIGS. 10a–10d are a series of diagrams illustrating data positioning within the frames for the various data rates while FIG. 10e is a diagram illustrating the data used in determining data position within the frame;

FIG. 14 is an exemplary circuit diagram of a FIR filter;

DETAILED DESCRIPTION OF THE PREFERRED EMBODIMENTS

Figure 1:
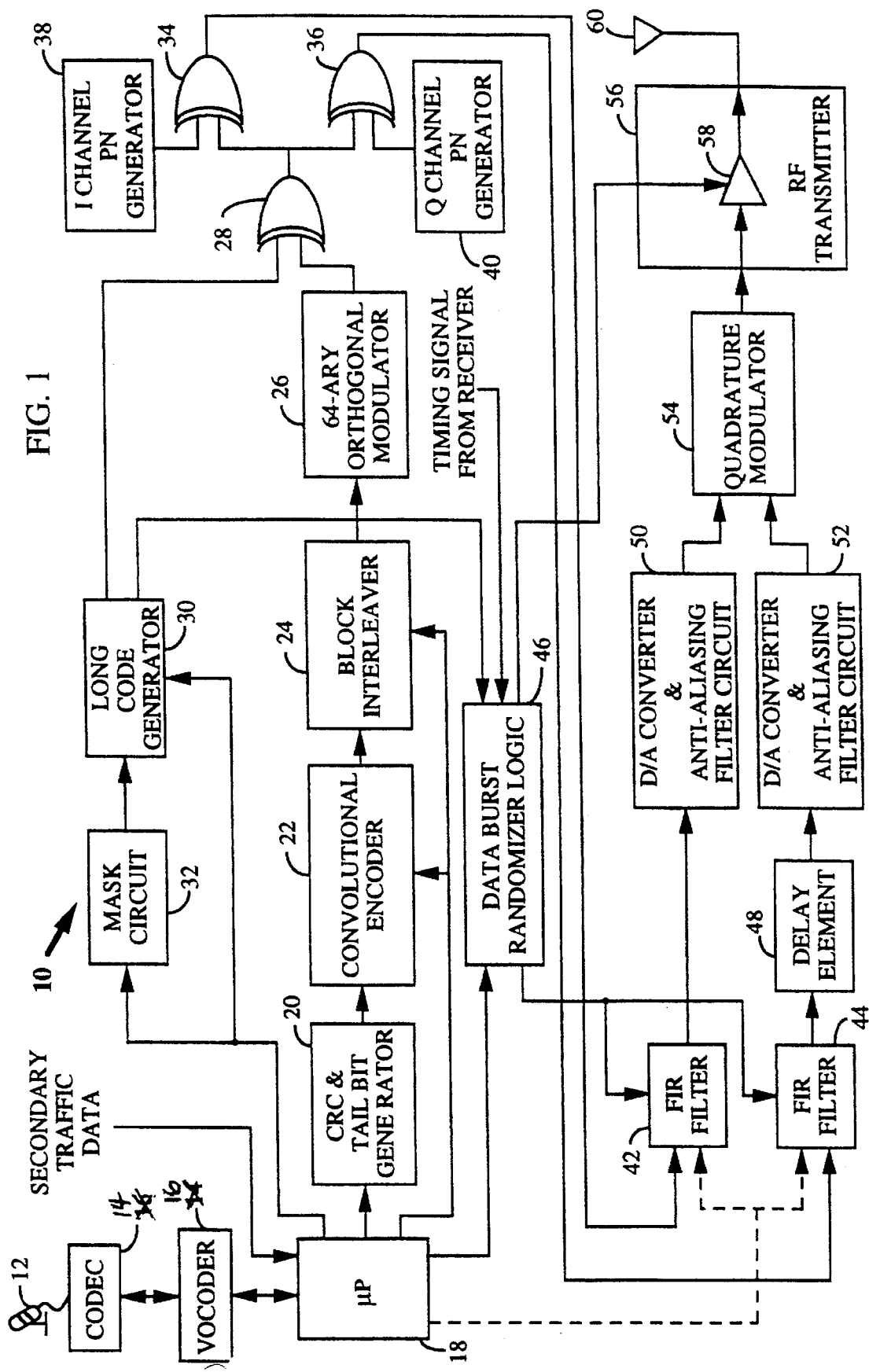
FIG. 1 is a block diagram illustrating an exemplary for a transmitter portion of a transceiver.

Referring now to the drawings, FIG. 1 illustrates an exemplary embodiment of a transmit portion 10 of a CDMA mobile station transceiver or PCN handset. In a CDMA cellular communication system a forward CDMA channel is used to transmit information from a cell base station to the mobile station. Conversely a reverse CDMA channel is used to transmit information from the mobile station to the cell base station. The communication of signals from the mobile station may be characterized in the form of an access channel or a traffic channel communication. The access channel is used for short signalling messages such as call originations, responses to pages, and registrations. The traffic channel is used to communicate (1) primary traffic, typically user speech data, or (2) secondary traffic, typically user non-speech data, or (3) signaling traffic, such as command and control signals, or (4) a combination of primary traffic and secondary traffic or (5) a combination of primary traffic and signaling traffic.

Transmit portion 10 enables data to be transmitted on the reverse CDMA channel at data rates of 9.6 kbps, 4.8 kbps, 2.4 kbps or 1.2 kbps. Transmissions on the reverse traffic channel may be at any of these data rates while transmissions on the access channel are at the 4.8 kbps data rate. The transmission duty cycle on the reverse traffic channel will vary with the transmission data rate. Specifically, the transmission duty cycle for each rate is provided in Table I. As the duty cycle for transmission varies proportionately with the data rate, the actual burst transmission rate is fixed at 28,800 code symbols per second. Since six code symbols are modulated as one of 64 Walsh symbols for transmission, the Walsh symbol transmission rate shall be fixed at 4800 Walsh symbols per second which results in a fixed Walsh chip rate of 307.2 kcps.

All data that is transmitted on the reverse CDMA channel is convolutional encoded, block interleaved, modulated by 64-ary orthogonal modulation, and direct-sequence PN spread prior to transmission. Table I further defines the relationships and rates for data and symbols for the various transmission rates on the reverse traffic channel. The numerology is identical for the access channel except that the transmission rate is fixed at 4.8 kbps, and the duty cycle is 100%. As described later herein each bit transmitted on the reverse CDMA channel is convolutional encoded using a rate ⅓ code. Therefore, the code symbol rate is always three times the data rate. The rate of the direct-sequence spreading functions shall be fixed at 1.2288 MHz, so that each Walsh chip is spread by precisely four PN chips.

TABLE I

| Bit Rate (kbps) | 9.6 | 4.8 | 2.4 | 1.2 |
|---|---|---|---|---|
| PN Chip Rate (Mcps) | 1.2288 | 1.2288 | 1.2288 | 1.2288 |
| Code Rate (bits/code symbol) | 1/3 | 1/3 | 1/3 | 1/3 |
| TX Duty Cycle (%) | 100.0 | 50.0 | 25.0 | 12.5 |
| Code Symbol Rate (sps) | 28800 | 28800 | 28800 | 28800 |
| Modulation (code symbol/Walsh symbol) | 6 | 6 | 6 | 6 |
| Walsh Symbol Rate (sps) | 4800 | 4800 | 4800 | 4800 |
| Walsh Chip Rate (kcps) | 307.20 | 307.20 | 307.20 | 307.20 |
| Walsh Symbol (µs) | 208.33 | 208.33 | 208.33 | 208.33 |
| PN Chips/Code Symbol | 42.67 | 42.67 | 42.67 | 42.67 |
| PN Chips/Walsh Symbol | 256 | 256 | 256 | 256 |
| PN Chips/Walsh Chip | 4 | 4 | 4 | 4 |

Transmit portion 10, when functioning in a mode in which primary traffic is present, communicates acoustical signals, such as speech and/or background noise, as digital signals over the transmission medium. To facilitate the digital communication of acoustical signals, these signals are sampled and digitized by well known techniques. For example, in FIG. 1, sound is converted by microphone 12 to an analog signal which is then converted to a digital signal by codec 14. Codec 14 typically performs an analog to digital conversion process using a standard 8 bit/µlaw format. In the alternative, the analog signal may be directly converted to digital form in a uniform pulse code modulation (PCM) format. In an exemplary embodiment, codec 14 uses 8 kHz sampling and provides an output of 8-bit samples at the sampling rate, so as to realize a 64 kbps data rate. The 8-bit samples are output from codec 14 to vocoder 16 where a µlaw/uniform code conversion process is performed. In vocoder 16, the samples are organized into frames of input data wherein each frame is comprised of a predetermined number of samples. In a preferred implementation of vocoder 16 each frame is comprised of 160 samples or of 20 msec. of speech at the 8 kHz sampling rate. It should be understood that other sampling rates and frame sizes may be used. Each frame of speech samples is variable rate encoded by vocoder 16 with the resultant parameter data formatted into a corresponding data packet. The vocoder data packets are then output to microprocessor 18 and associated circuitry for transmission formatting. Microprocessor 18 generically includes program instructions contained with a program instruction memory, a data memory, and appropriate interface and related circuitry as is known in the art.

A preferred implementation of vocoder 16 utilizes a form of the Code Excited Linear Predictive (CELP) coding techniques so as to provide a variable rate in coded speech data. A Linear Predictive Coder (LPC) analysis is performed upon a constant number of samples, and the pitch and codebook searches are performed on varying numbers of samples depending upon the transmission rate. A variable rate vocoder of this type is described in further detail in copending U.S. patent application Ser. No. 07/713,661 filed Jun. 11, 1991, and assigned to the Assignee of the present invention. Vocoder 16 may be implemented in an application specific integrated circuit (ASIC) or in a digital signal processor.

In the variable rate vocoder just mentioned, the speech analysis frames are 20 msec. in length, implying that the extracted parameters are output to microprocessor 18 in a burst 50 times per second. Furthermore the rate of data output is varied from roughly 8 kbps to 4 kbps to 2 kbps, and to 1 kbps.

At full rate, also referred to as rate 1, data transmission between the vocoder and the microprocessor is at an 8.55 kbps rate. For the full rate data the parameters are encoded for each frame and represented by 160 bits. The full rate data frame also includes a parity check of 11 bits thus resulting in a full rate frame being comprised of a total of 171 bits. In the full rate data frame, the transmission rate between the vocoder and the microprocessor absent the parity check bits would be 8 kbps.

At half rate, also referred to as rate ½, data transmission between the vocoder and the microprocessor is at a 4 kbps rate with the parameters encoded for each frame using 80 bits. At quarter rate, also referred to as rate ¼, data transmission between the vocoder and the microprocessor is at a 2 kbps rate with the parameters encoded for each frame using 40 bits. At eighth rate, also referred to as rate ⅛, data transmission between the vocoder and the microprocessor is slightly less than a 1 kbps rate with the parameters encoded for each frame using 16 bits.

In addition, no information may be sent in a frame between the vocoder and the microprocessor. This frame type, referred to as a blank frame, may be used for signaling or other non-vocoder data.

The vocoder data packets are then output to microprocessor 18 and then to CRC and Tail Bit generator 20 for completing the transmission formatting. Microprocessor 18 receives packets of parameter data every 20 msec. along with a rate indication for the rate the frame of speech samples was encoded. Microprocessor 18 also receives, if present, an input of secondary traffic data for output to generator 20. Microprocessor 18 also internally generates signaling data for output to generator 20. Data whether it is primary traffic, secondary traffic or signaling traffic matter, if present, is output from microprocessor 18 to generator 20 every 20 msec. frame.

Generator 20 generates and appends at the end of all full and half rate frames a set of parity check bits or cyclic redundancy check bits (CRC Bits) which are used at the receiver as a frame quality indicator. For a full rate frame, regardless of whether the data is a full rate primary, secondary or signaling traffic, or a combination of half rate primary and secondary traffic, or a combination of half rate primary and signaling traffic, generator 20 preferably generates a set of CRC Bits according to a first polynomial. For a half rate data frame, generator 20 also generates a set of CRC Bits preferably according to a second polynomial. Generator 20 further generates for all frames, regardless of the frame data rate, a set of Encoder Tail Bits. The Encoder Tail Bits follow the CRC bits, if present, or data if the CRC bits are not present, but in either case the Encoder Tail Bits are placed at the end of the frame. Further details of the operation on microprocessor 18 and generator 20 are provided later herein with reference to FIGS. 3 and 4.

FIGS. 2a–2h illustrate the frame formatting of data for the various data rates and data types for the reverse traffic channel. Specifically, FIGS. 2a–2d illustrate the data formatting for the various data types, i.e. vocoder and non-vocoder or combination thereof, at the 9.6 kbps data rate. FIGS. 2e–2h illustrate the data format-ting for vocoder data at rates 4.8, 2.4 and 1.2 kbps, respectively. In FIGS. 2a–2h in addition to the primary traffic bits and/or signalling/secondary traffic bits, additional control bits are transmitted in the frame. The following notation applies to the control bits in FIGS. 2a–2h and the bit values therefor:

Mixed Mode Bit (MM):
  '0'-Primary Traffic Only
  '1'-Primary Traffic and/or Signalling/Secondary Traffic
Burst Format Bit (BF):
  '0'-Dim and Burst
  '1'-Blank and Burst
Traffic type Bit (TT):
  '0'-Signalling
  '1'-Secondary
Traffic Mode Bits (TM):
  '00'-80 Primary Traffic Bits, 86 Signalling Traffic Bits (87 bits including Start of Message Bit), or 87 Secondary Traffic Bits
  '01'-Reserved for other bit packet arrangements
  '10'-Reserved for other bit packet arrangements
  '11'-Reserved for other bit packet arrangements
Start of Message Bit (SOM):
  '0'-Message does not begin at the following bit
  '1'-Message begins at the following bit
Frame Quality Indicator Bits—CRC (F); and
Encoder Tail Bits (T)

Reverse traffic channel flames provided from generator 20 at the 9.6 kbps rate are 192 bits in length and span the 20 msec. frame. These flames consist of a single Mixed Mode Bit, auxiliary format bits if present, message bits, a 12-bit frame quality indicator (CRC), and 8 Encoder Tail Bits as shown in FIGS. 2a–2e. The Mixed Mode Bit shall be set to '0' during any frame in which the message bits are primary traffic information only. When the Mixed Mode Bit is '0', the frame shall consist of the Mixed Mode Bit, 171 Primary Traffic bits, 12 CRC Bits, and 8 Encoder Tail Bits.

The Mixed Mode Bit is set to '1' for frames containing secondary or signaling traffic. In these instances the first bit following the Mixed Mode Bit is a Burst Format Bit which specifies whether the frame is in a "blank-and-burst" or a "dim-and-burst" format. A "blank-and-burst" operation is one in which the entire frame is used for secondary or signaling traffic while a "dim-and-burst" operation is one in which the primary traffic shares the frame with either secondary or signaling traffic. If the Burst Format Bit is a '0', the frame is of the "dim and burst format", and if a '1' the frame is of the "blank and burst format".

The second bit following the Mixed Mode Bit is a Traffic Type Bit. The Traffic Type Bit is used to specify whether the frame contains secondary or signaling traffic. If the Traffic Type Bit is a '0', the frame contains signaling traffic, and if a T, the frame contains secondary traffic. FIGS. 2b–through 2e illustrate the use of the Burst Format Bit and the Traffic Type Bit.

When the Burst Format Bit is '0' denoting dim-and-burst, the two bits following the Traffic Type Bit are Traffic Mode Bits. These bits indicate the number of bits that are used for primary traffic information and the number of bits that shall be used for either signaling or secondary traffic information within that frame. For a default mode, only the Traffic Mode '00' is defined with all other traffic modes are reserved for other bit arrangements. Referring to FIGS. 2b and 2c, in the exemplary and preferred embodiment, 80 bits are used for primary traffic (half rate vocoder data packet) while 86 and 87 bits are respectively used for signaling and secondary traffic.

In frames where there is signaling traffic present the first bit of the frame's signaling portion is a Start of Message (SOM) Bit. The SOM Bit is a '1' if a reverse traffic channel message (signaling message) begins at the following bit. Generally the first bit of a reverse traffic channel message does not begin anywhere else in the frame other than following the SOM Bit. However should the frame contains part of a message that began in a previous frame the SOM Bit is a '0'. If the SOM Bit is a '0' the following bit is part of the message but it is not the first bit of the complete message.

Figure 2F:
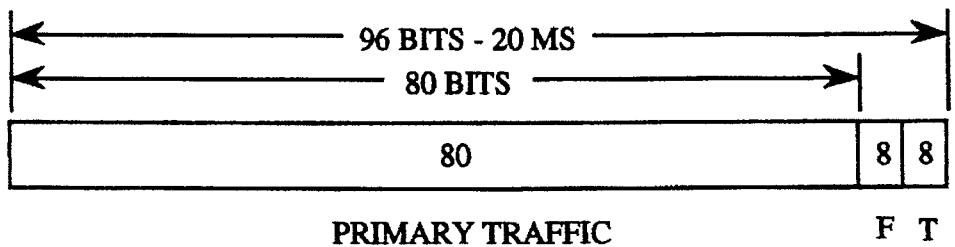
Figure 2G:
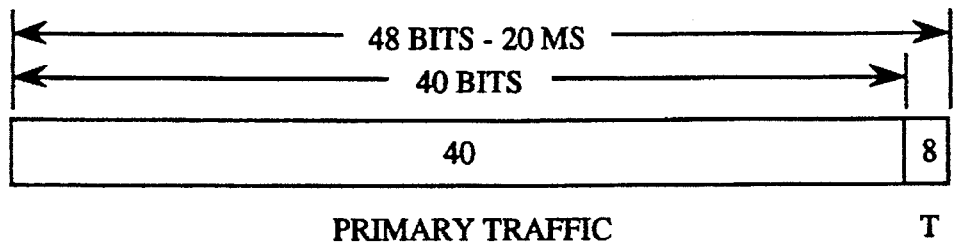
Figure 2H:
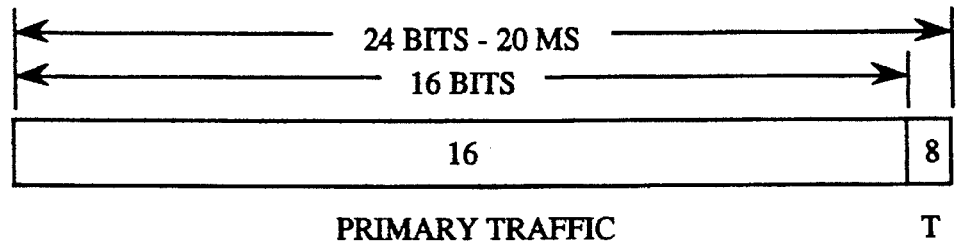
Figure 4A:
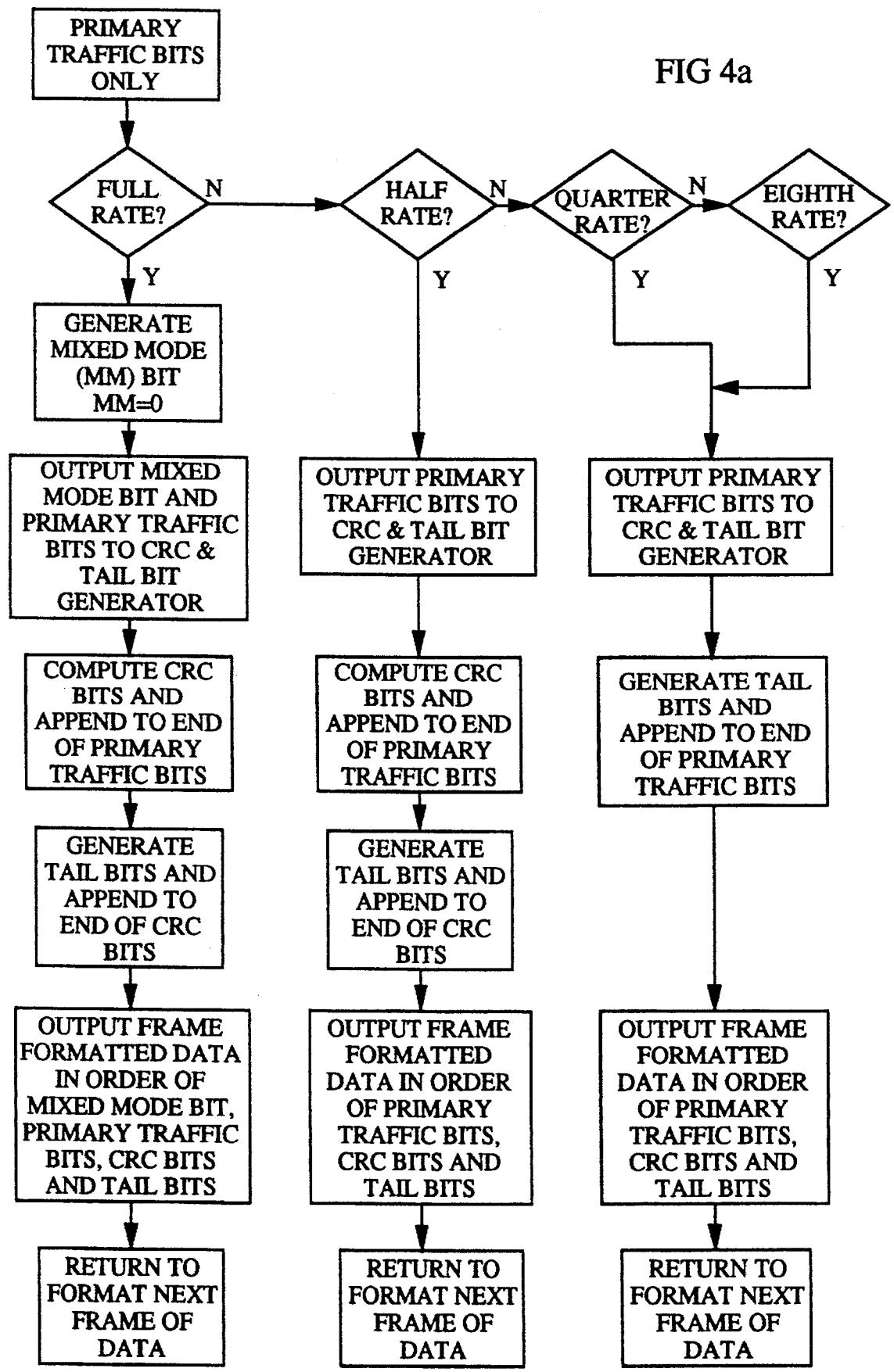
FIGS. 4a–4e are a series of flow charts illustrating the process in formatting of the data flames.
Figure 4B:
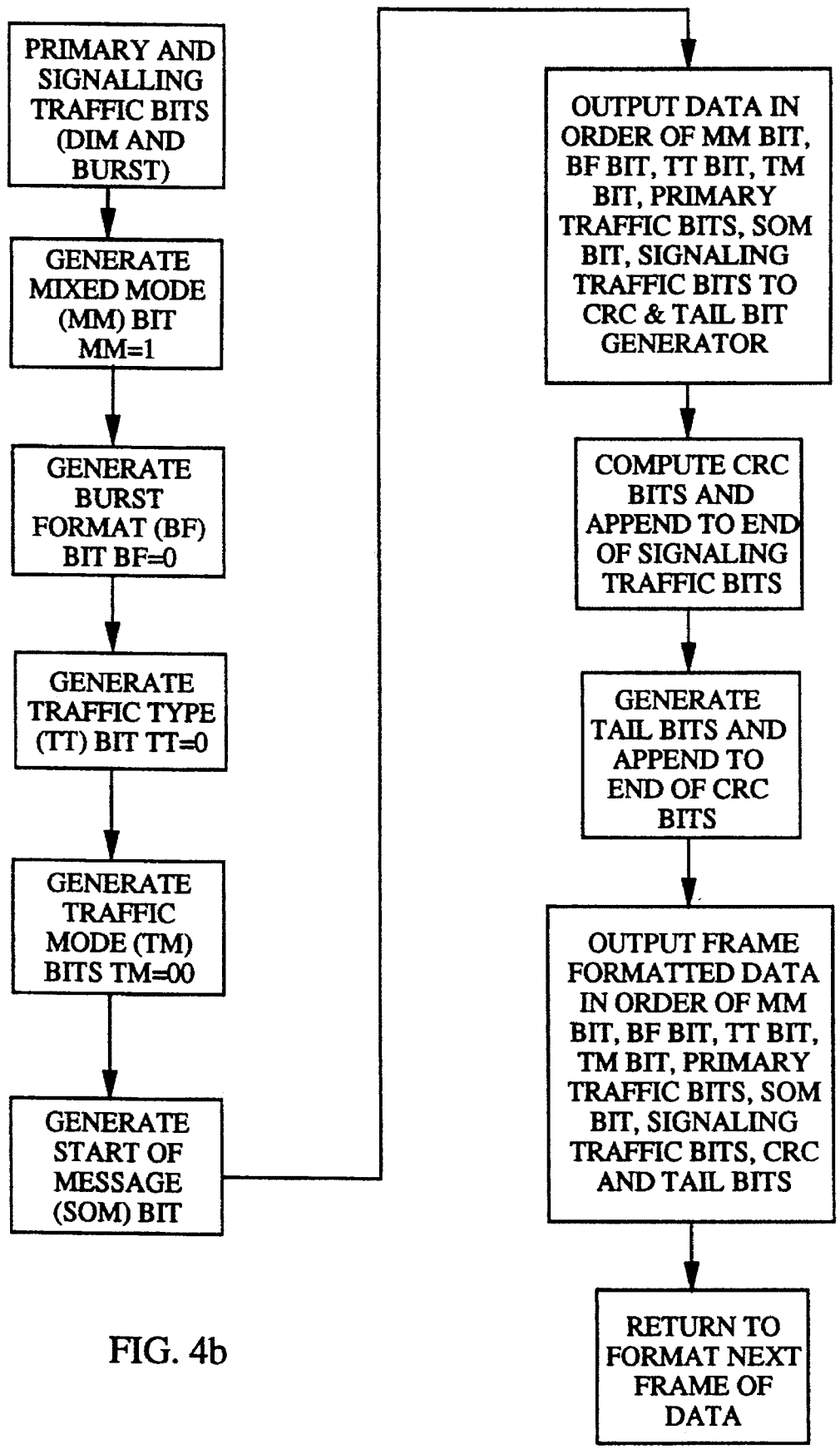
Figure 4C:
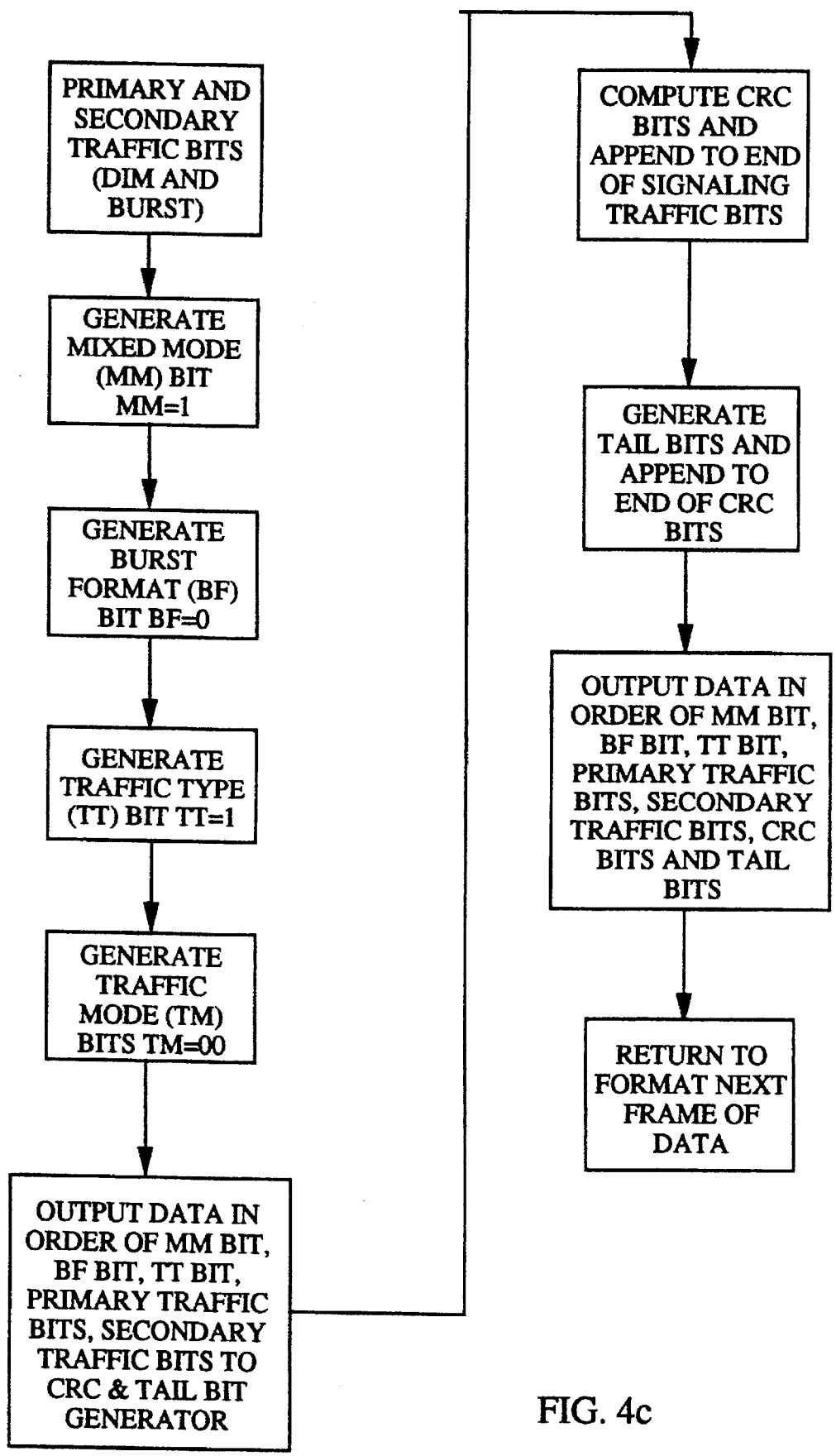
Figure 4D:
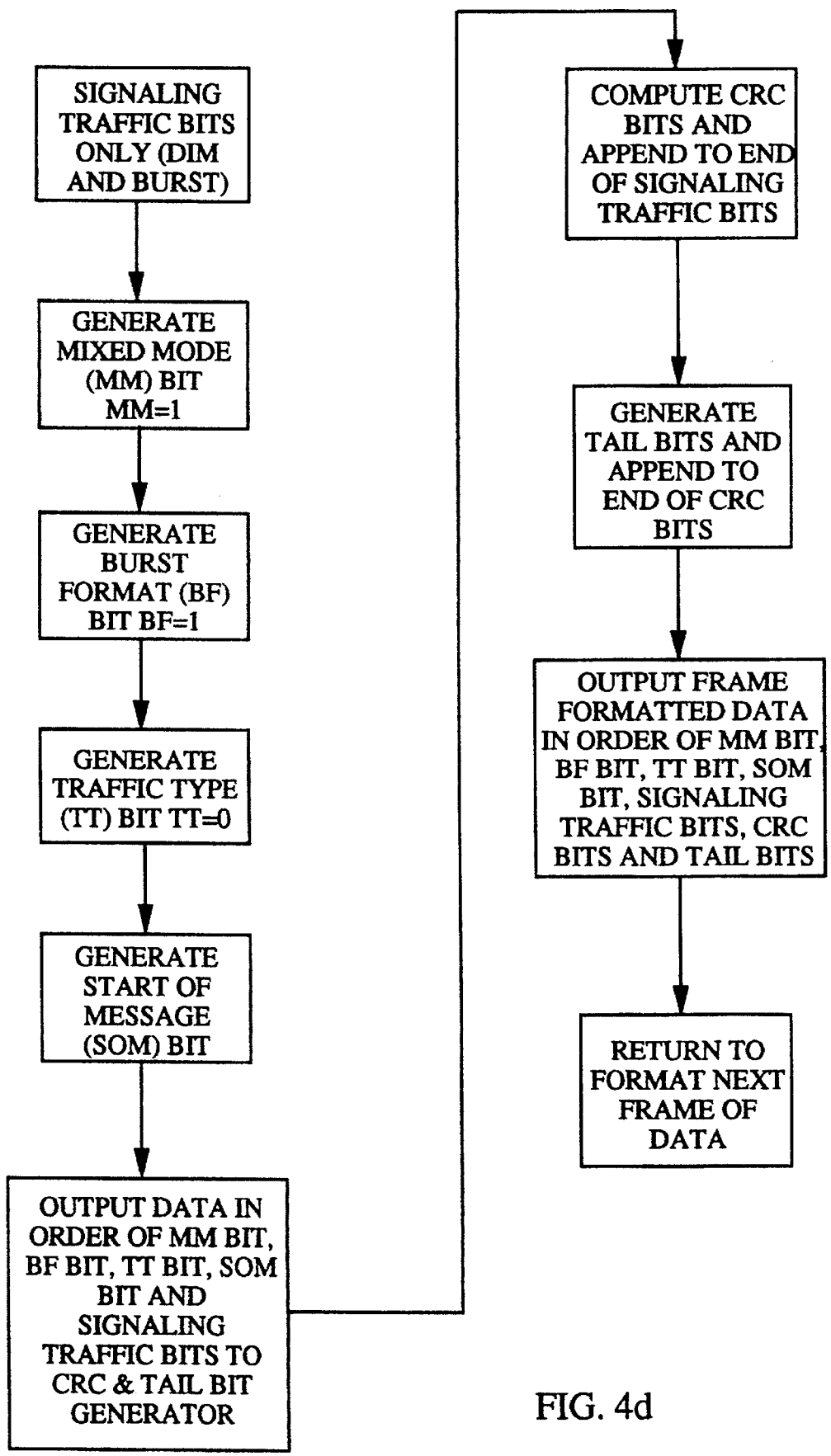
Figure 4E:
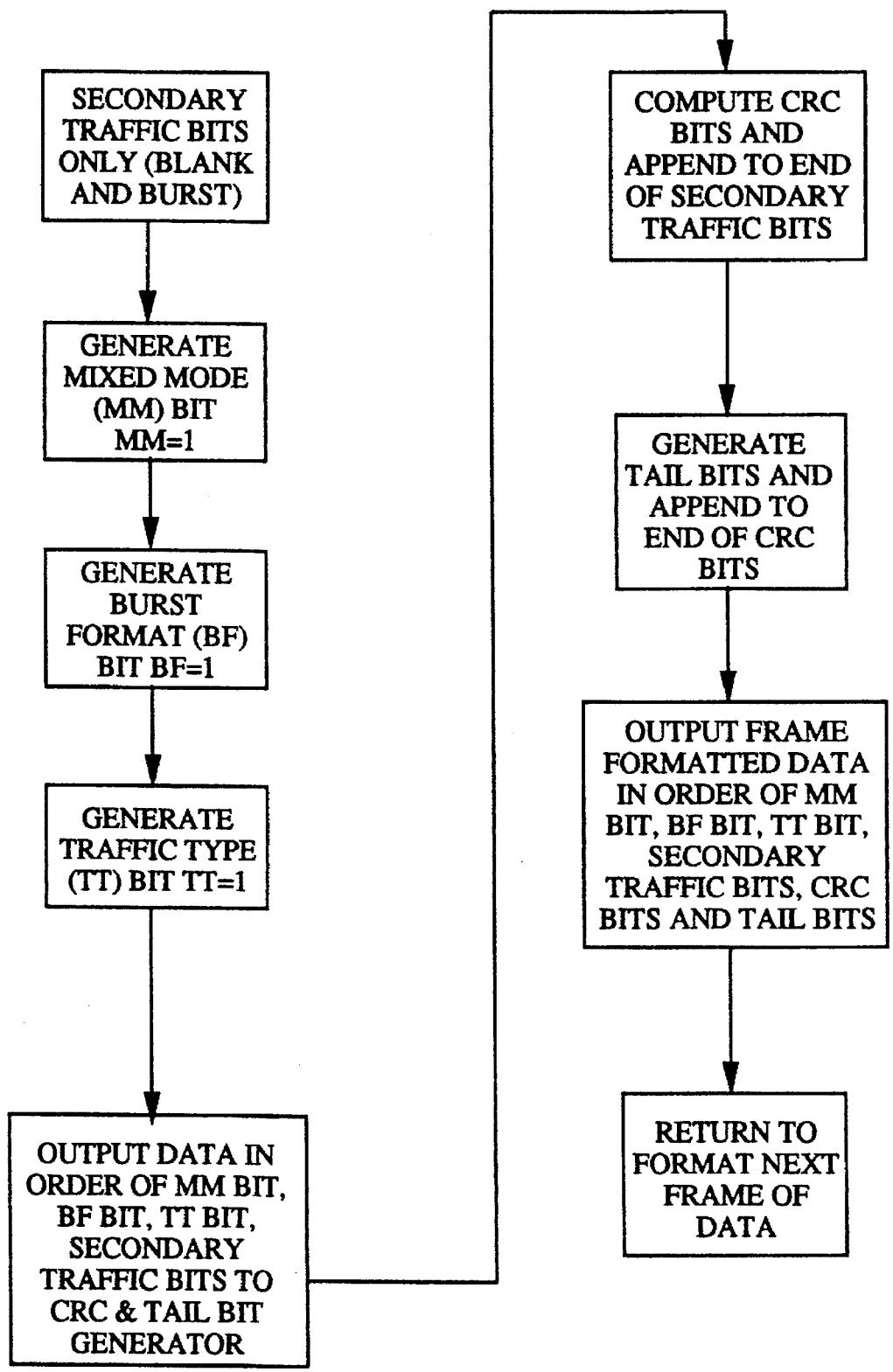

In the preferred implementation only primary traffic is transmitted in frames at the 4.8 kbps, 2.4 kbps, and 1.2 kbps rates. Mixed mode operation is generally not be supported at rates other than the 9.6 kbps rate, although it may be readily configured. The frame formats for these particular rates are shown in FIGS. 2f–2h. For the 4.8 kbps rate, the frame is 96 bits in length with the bits spaced over the 20 msec. time period of the frame as described later herein. The 4.8 kbps rate frame contains 80 primary traffic bits, an 8-bit frame quality indicator (CRC), and 8 Encoder Tail Bits. For the 2.4 kbps rate, the frame is 48 bits in length with the bits spaced over the 20 msec. time period of the frame as also described later herein. The 2.4 kbps rate frame contains 40 primary traffic bits and 8 Encoder Tail Bits. For the 1.2 kbps rate, the frame is 24 bits in length with the bits spaced over the 20 msec. time period of the frame as also described later herein. The 1.2 kbps rate frame contains 16 primary traffic bits and 8 encoder tail bits.

In a preferred embodiment the access channel data is generated by microprocessor 18 for transmission at a rate of 4.8 kbps. As such the data is prepared in a manner identical to that of 4.8 kbps frame format data, such as encoding, interleaving and Walsh encoding. In the encoding scheme implemented for the 4.8 kbps data, whether reverse traffic channel data or access channel data, redundant data is generated. Unlike the reverse traffic channel where the redundant data is eliminated in the transmission, in the access channel all data including redundant data is transmitted. Details on the transmission aspects of frames of access channel data are provided later herein.

FIG. 3 illustrates an exemplary implementation of the elements for formatting the data in accordance with FIGS. 2a–2h. In FIG. 3 data is transmitted from microprocessor 18 (FIG. 1) to generator 20. Generator 20 is comprised of data buffer and control logic 60, CRC circuits 62 and 64, and Tail Bit circuit 66. Along with data provided from the microprocessor a rate command may optionally be provided. Data is transferred for each 20 msec frame from the microprocessor to logic 60 where temporarily stored. For each frame, logic 60 may for each frame count the number of bits transmitted from the microprocessor, or in the alternative use the rate command and a count of the clock cycles in formatting a frame of data.

Each frame of the traffic channel includes a frame quality indicator. For the 9.6 kbps and 4.8 kbps transmission rates, the frame quality indicator is the CRC. For the 2.4 kbps and 1.2 kbps transmission rates, the frame quality indicator is implied, in that no extra frame quality bits are transmitted. The frame quality indicator supports two functions at the receiver. The first function is to determine the transmission rate of the frame, while the second function is to determine whether the frame is in error. At the receiver these determinations are made by a combination of the decoder information and the CRC checks.

For the 9.6 kbps and 4.8 kbps rates, the frame quality indicator (CRC) is calculated on all bits within the frame, except the frame quality indicator (CRC) itself and the Encoder Tail Bits. Logic 60 provides the 9.6 kbps and 4.8 kbps rate data respectively to CRC circuits 62 and 64. Circuits 62 and 64 are typically constructed as a sequence of shift registers, modulo-2 adders (typically exclusive-OR gates) and switches as illustrated.

The 9.6 kbps transmission rate data uses a 12-bit frame quality indicator (CRC), which is to be transmitted within the 192-bit long frame as discussed with reference to FIGS. 2a–2e. As illustrated in FIG. 3 for CRC circuit 62, the generator polynomial for the 9.6 kbps rate is as follows:

$$g(x)=x^{12}+x^{11}+x^{10}+x^9+x^8+x^4+x+1. \quad (1)$$

The 4.8 kbps transmission rate data uses an 8-bit CRC, which is transmitted within the 96-bit long frame as discussed with reference to FIG. 2f. As illustrated in FIG. 3 for CRC circuit 64, the generator polynomial for the 4.8 kbps rate is as follows:

$$g(x)=x^8+x^7+x^4+x^3+x+1. \quad (2)$$

Initially, all shift register elements of circuits 62 and 64 are set to logical one ('1') by an initialization signal from logic 60. Furthermore logic 60 set the switches of circuits 62 and 64 in the up position. For 9.6 kbps rate data, the registers of circuit 62 are then clocked 172 times for the 172 bits in the sequence of primary traffic, secondary traffic or signaling bits or a mixture thereof along with the corresponding mode/format indicator bits as input to circuit 62. After 172 bits are clocked through circuit 62, logic 60 then sets the switches of circuit 62 in the down position with the registers of circuit 62 then being clocked an additional 12 times. As a result of the 12 additional clockings of circuit 62, 12 additional output bits are generated which are the CRC bits. The CRC bits, in the order calculated, are appended to the end of the 172 bits as output from circuit 62. It should be noted that the 172 bits output from logic 60 which pass through circuit 62 are undisturbed by the computation of the CRC bits and are thus output from circuit 62 in the same order and at the same value at which they entered.

For 9.6 kbps rate data bits are input to circuit 62 from logic 60 in the following order. For the case of primary traffic only, the bits are input to circuit 62 from logic 60 in the order of the single mixed mode (MM) bit followed by the 171 primary traffic bits. For the case of "dim and burst" with primary and signaling traffic, the bits are input to circuit 62 from logic 60 in the order of the single MM bit, a single burst format (BF) bit, a traffic type (TT) bit, a pair of traffic mode (TM) bits, 80 primary traffic bits, a start of message (SOM) bit, and 86 signalling traffic bits. For the case of "dim and burst" with primary and secondary traffic, the bits are input to circuit 62 from logic 60 in the order of the single MM bit, the single BF bit, the TT bit, the pair of TM bits, 80 primary traffic bits and 87 signalling traffic bits. For the case of "blank and burst" data format with signaling traffic only, the bits are input to circuit 64 from logic 60 in the order of the single MM bit, the single BF bit, the TT bit, the SOM bit and 168 signalling traffic bits. For the case of "blank and burst" data format with secondary traffic only, the bits are input to circuit 64 from logic 60 in the order of the single MM bit, the single BF bit, the TT bit and 169 signalling traffic bits.

Similarly for 4.8 kbps rate data, the registers of circuit 64 are clocked 80 times for the 80 bits of primary traffic data, or for the 80 bits of access channel data, as input to circuit 64 from logic 60. After the 80 bits are clocked through circuit 64, logic 60 then sets the switches of circuit 64 in the down position with the registers of circuit 64 then being clocked an additional 8 times. As a result of the 8 additional clockings of circuit 64, 8 additional output bits are generated which are the CRC bits. The CRC bits, in the order calculated, are again appended to the end of the 80 bits as output from circuit 62. It should again be noted that the 80 bits output from logic 60 which pass through circuit 62 are undisturbed by the computation of the CRC bits and are thus output from circuit 62 in the same order and at the same value at which they entered.

The bits output from either of circuits 62 and 64 are provided to switch 66 which is under the control of logic 60. Also input to switch 66 are the 40 and 16 bits of primary traffic data output from logic 60 for 2.4 kbps and 1.2 kbps data frames. Switch 66 selects between providing an output of the input data (up position) and tail bits at a logical zero ('0') value (down position). Switch 66 is normally set in the up position to permit data from logic 60, and from circuits 62 and 64 if present, to be output from generator 20 to encoder 22 (FIG. 1). For the 9.6 kbps and 4.8 kbps frame data, after the CRC bits are clocked through switch 66, logic 60 sets the switch to the down position for 8 clock cycles so as to generate 8 all zero tail bits. Thus for 9.6 kbps and 4.8 kbps data frames, the data as output to the encoder for the frame includes appended after the CRC bits, the 8 tail bits. Similarly for the 2.4 kbps and 1.2 kbps frame data, after the primary traffic bits are clocked from logic 60 through switch 66, logic 60 sets the switch to the down position for 8 clock cycles so as to again generate 8 all zero tail bits. Thus for 2.4 kbps and 1.2 kbps data frames, the data as output to the encoder for the frame includes appended after the primary traffic bits, the 8 tail bits.

FIGS. 4a–4e illustrate in a series of flow charts the operation of microprocessor 18, and generator 20 in assembling the data into the disclosed frame format. It should be noted that various schemes may be implemented for giving the various traffic types and rates priority for transmission. In an exemplary implementation, when a signaling traffic message is to be sent when there is vocoder data present a "dim and burst" format may be selected. Microprocessor 18 may generate a command to vocoder 18 for the vocoder to encode speech sample frames at the half rate, regardless of the rate at which the vocoder would have otherwise normally encoded the sample frame. Microprocessor 18 then assembles the half rate vocoder data with the signaling traffic into the 9.6 kbps frame as illustrated in FIG. 2b. In this case, a limit may be placed on the number of speech frames encoded at the half rate to avoid degradation in the speech quality. In the alternative, microprocessor 18 may wait until a half rate frame of vocoder data is received before assembling the data into the "dim and burst" format. In this case, in order to ensure timely transmission of the signaling data, a maximum limit on the number of consecutive frames at other than half rate may be imposed before a command is sent to the vocoder to encode at half rate. Secondary traffic may be transferred in the "dim and burst" format (FIG. 2c) in a similar manner.

Similar is the case for the "blank and burst" data formats as illustrated in FIGS. 2d–2e. The vocoder may be commanded to not encode the frame of speech samples or the vocoder data is ignored by the microprocessor in constructing the data frame. Prioritizing between generating frame formats of primary traffic at various rates, "dim and burst" traffic, and "blank and burst" traffic is open to many possibilities.

Referring back to FIG. 1, 20 msec. frames of 9.6 kbps, 4.8 kbps, 2.4 kbps and 1.2 kbps data are thus output from generator 20 to encoder 22. In the exemplary embodiment encoder 22 is preferably a convolutional encoder, a type of encoder well known in the art. Encoder 22 preferably encodes the data using a rate ⅓, constraint length k=9 convolutional code. As an example encoder 22 is constructed with generator functions of $g_0$557(octal), $g_1$=663 (octal) and $g_2$711(octal). As is well known in the art, convolutional encoding involves the modulo-2 addition of selected taps of a serially time-shifted delayed data sequence. The length of the data sequence delay is equal to k-1, where k is the code constraint length. Since in the preferred embodiment a rate ⅓ code is used, three code symbols, the code symbols $(c_0)$, $(c_1)$ and $(c_2)$, are generated for each data bit input to the encoder. The code symbols $(c_0)$, $(c_1)$ and $(c_2)$ are respectively generated by the generator functions $g_0$, $g_1$ and $g_2$. The code symbols are output from encoder 22 to block interleaver 24. The output code symbol are provided to interleaver 24 in the order of the code symbol $(c_0)$ being first, the code symbol $(c_1)$ being second and the code symbol $(c_2)$ being last. The state of the encoder 22, upon initialization, is the all-zero state. Furthermore the use of tail bits at the end of each frame provides a resetting of encoder 22 to an all-zero state.

The symbols output from encoder 22 are provided to block interleaver 24 which under the control of microprocessor 18 provides a code symbol repetition. Using a conventional random access memory (RAM) with the symbols stored therein as addressed by microprocessor 18, code symbols may be stored in a manner to achieve a code symbol repetition rate that varies with the data channel.

In a more expedient and preferred implementation the microprocessor need not be burdened with data interleaver control responsibility. In the preferred implementation microprocessor 18 merely need only provide the rate information signals along with the frame data to encoder 22. Using the rate information, encoder 22 controls the rate at which encoder symbols are generated. Interleaver 24 includes logic which internally addresses the memory locations at a constant rate. Encoder 22 encodes data at less than full rate at a slower rate such that the encoded symbols are stored in multiple locations in interleaver 24.

In either implementation, code symbols are not repeated for the 9.6 kbps data rate. Each code symbol at the 4.8 kbps data rate is repeated 1 time, i.e. each symbol occurs 2 times. Each code symbol at the 2.4 kbps data rate is repeated 3 times, i.e. each symbol occurs 4 times. Each code symbol at the 1.2 kbps data rate is repeated 7 times, i.e. each symbol occurs 8 times. For all data rates (9.6, 4.8, 2.4 and 1.2 kbps), the code repetition results in a constant code symbol rate of 28,800 code symbols per second for the data as output from interleaver 24. On the reverse traffic channel the repeated code symbols are not transmitted multiple times with all but one of the code symbol repetitions deleted prior to actual transmission due to the variable transmission duty cycle as discussed in further detail below. It should be understood that the use of code symbol repetition is an expedient method for describing the operation of the interleaver and a data burst randomizer as discussed in further detail below. It should be further understood that implementations other than those that use code symbol repetition may be readily devised to achieve the same result and remain within the teaching of the present invention.

All code symbols to be transmitted on the reverse traffic channel and the access channel are interleaved prior to modulation and transmission. Block interleaver 24, constructed as is well known in the art, provides an output of the code symbols over a time period spanning 20 msec. The interleaver structure is typically a rectangular array with 32 rows and 18 columns, i.e. 576 cells. Code symbols are written into the interleaver by columns, with repetition for data at the 4.8, 2.4 and 1.2 kbps rate, so as to completely fill the 32×18 matrix. FIGS. 5a–5d illustrate the ordering of write operations of original and repeated code symbols into the interleaver array for transmission data rates of 9.6, 4.8, 2.4 and 1.2 kbps, respectively.

Reverse traffic channel code symbols are output from the interleaver by rows. Microprocessor 18 also controls the addressing of the interleaver memory for outputting the symbols in the appropriate order. Again, in an alternate and preferred implementation microprocessor 18 is relieved from interleaver addressing responsibilities. In this implementation the interleaver again uses the internal addressing logic to provide an output of the stored symbols in the appropriate order. The interleaver stored symbols are preferably output in the following row order:

At 9.6 kbps: 1 2 3 4 5 6 7 8 9 10 11 12 13 14 15 16 17 18 19 20 21 22 23 24 25 26 27 28 29 30 31 32

At 4.8 kbps: 1 3 2 4 5 7 6 8 9 10 11 12 13 15 14 16 17 19 18 20 21 22 23 24 25 27 26 28 29 31 30 32

At 2.4 kbps: 1 5 2 6 3 7 4 8 9 13 10 14 11 15 12 16 17 21 18 22 19 23 20 24 25 29 26 30 27 31 28 32

At 1.2 kbps: 1 9 2 10 3 11 4 12 5 13 6 14 7 15 8 16 17 25 18 26 19 27 20 28 21 29 22 30 23 31 24 32.

Access channel code symbols are also output from interleaver 24 by rows in the appropriate order using the techniques discussed above. The interleaver stored symbols are output in the following row order at the 4.8 kbps rate for the access channel code symbols:

1 17 9 25 5 21 13 29 3 19 11 27 7 23 15 31 2 18 10 26 6 22 14 30 4 20 12 28 8 24 16 32.

It should be noted that other encoding rates, such as a rate ½ convolutional code used on the forward transmission channel, along with various other symbol interleaving formats may be readily devised using the basic teaching of the present invention.

Referring again to FIG. 1, the interleaved code symbols are output from interleaver 24 to modulator 26. In the preferred embodiment modulation for the Reverse CDMA Channel uses 64-ary orthogonal signaling. That is, one of 64 possible modulation symbols is transmitted for each six code symbols. The 64-ary modulation symbol is one of 64 orthogonal waveforms generated preferably using Walsh functions. These modulation symbols are given in FIGS. 6a, 6b and 6c and are numbered 0 through 63. The modulation symbols are selected according to the following formula:

$$\text{Modulation symbol number} = c_0 + 2c_1 + 4c_2 + 8c_3 + 16c_4 + 32c_5 \quad (3)$$

where $c_5$ shall represent the last or most recent and $c_0$ the first or oldest binary valued ('0' and '1') code symbol of each group of six code symbols that form a modulation symbol. The period of time required to transmit a single modulation symbol is referred to as a "Walsh symbol" interval and is approximately equal to 208.333 μs. The period of time associated with one-sixty-fourth of the modulation symbol is referred to as a "Walsh chip" and is approximately equal to 3.2552083333 . . . μs.

Each modulation or Walsh symbol is output from modulator 26 to one input of a modulo-2 adder, exclusive-OR gate 28. The Walsh symbols are output from modulator 26 at a 4800 sps rate which corresponds to a Walsh chip rate of 307.2 kcps. The other input to gate 28 is provided from long code generator 30 which generates a pseudonoise or pseudorandom (PN) code. referred to as the long code sequence, in cooperation with mask circuit 32. The long code sequence provided from generator 30 is at a chip rate four times the Walsh chip rate of modulator 26, i.e. a PN chip rate 1.2288 Mcps. Gate 28 combines the two input signals to provide an output of spread data at the chip rate of 1.2288 Mcps.

The long code sequence is a time shift of a sequence of length $2^{42}-1$ chips and is generated by a linear generator well known in the art using the following polynomial:

$$p(x)=x^{42}+x^{35}+x^{33}+x^{31}+x^{27}+x^{26}+x^{25}+x^{22}+x^{21}+x^{19}+x^{18}+x^{17}+x^{16}+x^{10}+x^{7}+x^{6}+x^{5}+x^{3}+x^{2}+x^{1}+1. \tag{4}$$

Figure 7:
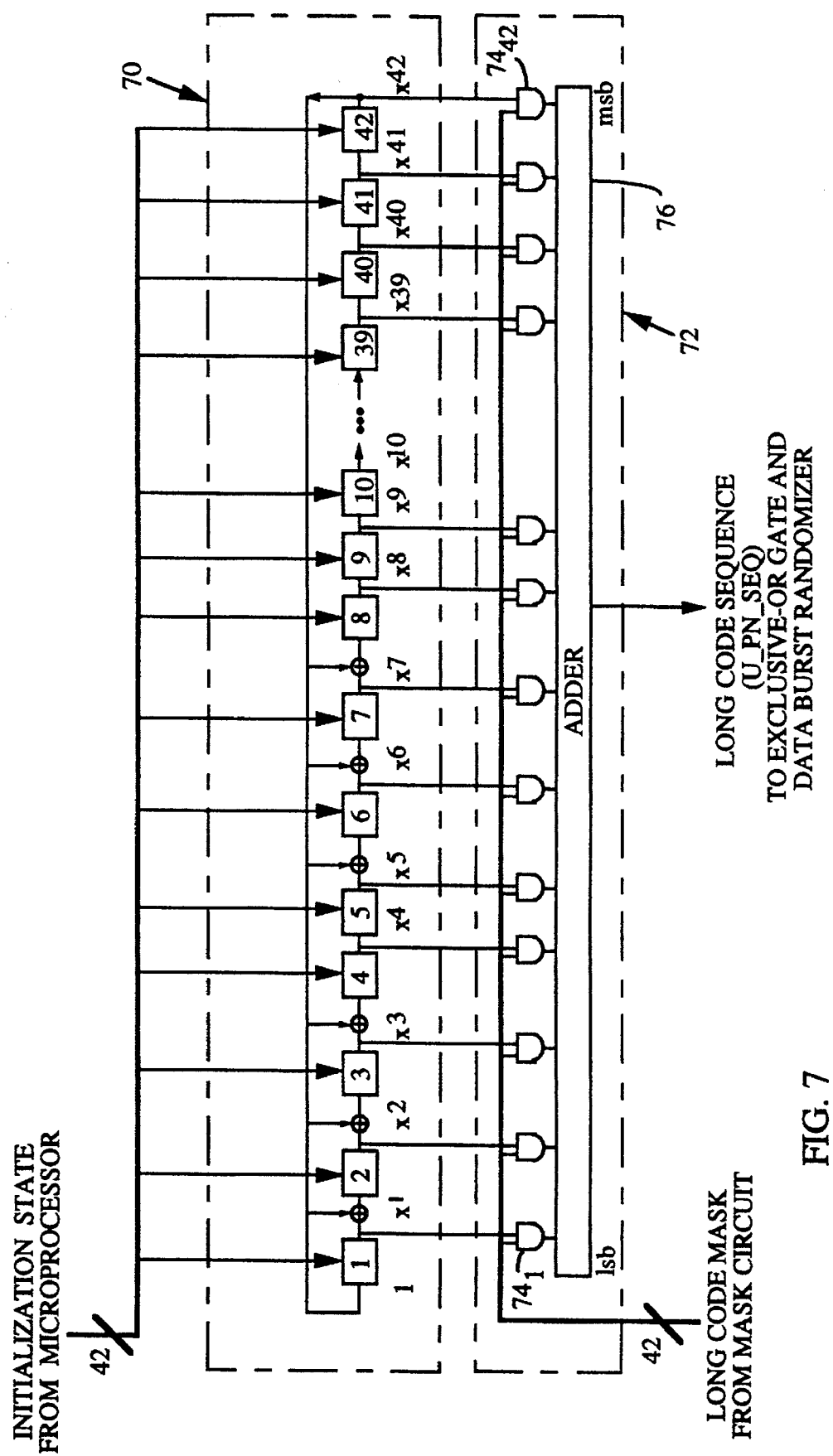
FIG. 7 is a block diagram illustrating the long code generator of FIG. 1.

FIG. 7 illustrates generator 30 in further detail. Generator 30 is comprised of sequence generator section 70 and masking section 72. Section 70 is comprised of a sequence of shift registers and modulo-2 adders (typically exclusive-OR gates) coupled together to generate a 42-bit state variables according to equation 4. The 42-bit state variables output from section 70 are provided to section 72 along with a 42-bit wide mask provided from mask circuit 32.

Section 72 is comprised of a series of input AND gates $74_1$–$74_{42}$ having one input for receiving a respective one of the 42 state variable bits. The other input of each of AND gates $74_1$–$74_{42}$ receives a respective one of the 42 mask bits. The output of AND gates $74_1$–$74_{42}$ are then modulo-2 added by adder 76 so as to form a single bit output from section 72 for each 1.2288 MHz clocking of the shift registers of section 70. Adder 76 is typically constructed as a cascaded arrangement of exclusive-OR gates as is well known in the art. Therefore, the actual output PN sequence U_PN_SEQ is generated by the modulo-2 addition of the masked output bits of section 70.

Figure 8A:
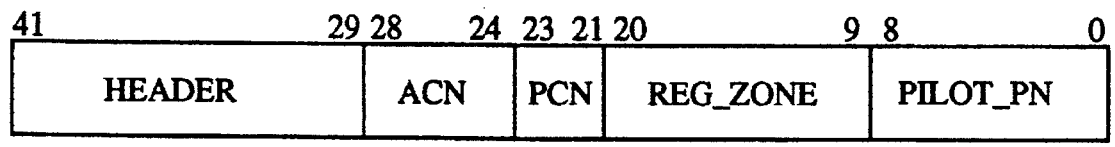
FIGS. 8a–8c are a series of diagrams illustrating long code masks for the various channel type.
Figure 8B:
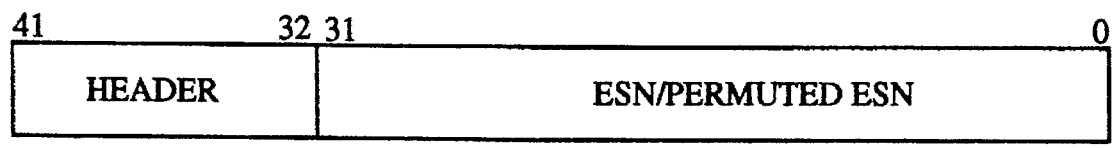
Figure 8C:
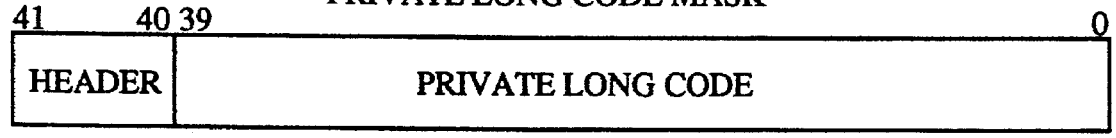

The mask used for the PN spreading varies depending on the channel type on which the mobile station is communicating. Referring back to FIG. 1, initialization information is provided from microprocessor 18 to generator 30 and circuit 32. Generator 30 is responsive to the initialization information for initialization of the circuitry. Circuit 32 is also responsive to the initialization information, which also indicates the type of mask to be provided by circuit 32 to generator 30. As such, mask circuit 32 may be configured as a memory which contains a 42-bit mask for each communication channel type. FIGS. 8a–8c provide an exemplary definition of the masking bits for each channel type.

Specifically, when communicating on the access channel, the mask is defined as illustrated in FIG. 8a. In the access channel mask, mask bits $M_{29}$ through $M_{41}$ are mask header bits; mask bits $M_{24}$ through $M_{28}$ are bits indicative of the access channel number (ACN); mask bits $M_{21}$ through $M_{23}$ are bits indicative of the code channel for the associated paging channel, i.e, paging channel number (PCN), with the range typically being 1 through 7; mask bits $M_9$ through $M_{20}$ are bits indicative of the registration zone (REG_ZONE); and mask bits $M_0$ through $M_8$ are bits indicative of the pilot PN offset (PILOT_PN) for the current base station.

When communicating on the reverse traffic channel, the mask is defined as illustrated in FIGS. 8b and 8c. The mobile station uses one of two long codes unique to that mobile station: a public long code which is a function of the mobile station's electronic serial number (ESN); and a private long code unique for each mobile identification number (MIN) which is typically the telephone number of the mobile station.

In the public long code, FIG. 8b, mask bits $M_{32}$ through $M_{41}$ are header bits; and mask bits $M_0$ through $M_{31}$ are bits set as a one-to-one function of the mobile station ESN. Thus these bits may either directly correspond to the ESN or a permuted version thereof. In the private long code the mask bits $M_{40}$ through $M_{41}$ are header bits; and mask bits $M_0$ through $M_{39}$ correspond to bits set according to a predetermined assignment scheme.

It is envisioned that the private long code be implemented as illustrated in FIG. 8c, although other masking codes may be generated. The private long code will provide additional security to the data transmissions in that it will only be known to the base station and the mobile station. The private long code preferably will not be transmitted over the transmission medium.

Referring back to FIG. 1 the output of gate 28 is respectively provided as one input to each one of a pair of modulo-2 adders, exclusive-OR gates 34 and 36. The other input to each of gates 34 and 36 are respectively second and third PN sequences, I and Q channel "short codes", respectively generated by I and Q Channel PN generators 38 and 40. The reverse access channel and reverse traffic channel is therefore offset quadrature phase shift key (OQPSK) spread prior to actual transmission. This offset quadrature spreading on the reverse channel uses the same I and Q PN codes as are used in the cell base station to mobile station communication, i.e. the forward channel.

The I and Q PN codes generated by generators 38 and 40 are of length $2^{15}$ and are preferably zero-time offset codes with respect to the forward channel. For purposes of further understanding, on the forward channel a pilot signal is generated for each base station. Each base station pilot channel signal is spread by the I and Q PN codes as described with respect to the mobile station. The I and Q PN codes of a base station are together offset from those of another base station. By shifting both code sequences transmissions by different base stations may be distinguished. The generating functions for the I and Q short PN codes are as follows:

$$P_I(x)=x^{15}+x^{13}+x^{9}+x^{8}+x^{7}+x^{5}+1 \tag{5}$$

and $$P_Q(x)=x^{15}+x^{12}+x^{11}+x^{10}+x^{6}+x^{5}+x^{4}+x^{3}+1. \tag{6}$$

Generators 38 and 40 may be constructed so as to provide an output sequence in accordance with equations (5) and (6).

The I and Q waveforms are output from gates 34 and 36 and provided as inputs to finite impulse response (FIR) filters 42 and 44. FIR filters 42 and 44 are digital filters which bandlimit the resulting I and Q waveforms. These digital filters shape the I and Q waveforms such that the resulting spectrum is contained within a given frequency spectrum. The digital filters preferably have the impulse response shown in Table II below.

Figure 9:
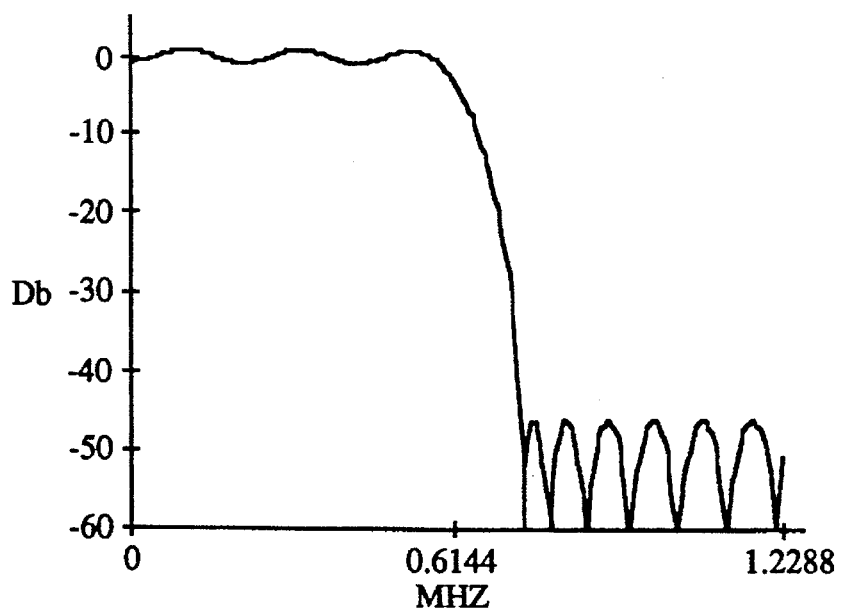
FIG. 9 is a graph illustrating the frequency response of the digital filters of FIG. 1.

Filters 42 and 44 may be constructed according to well known digital filter techniques and preferably provide a frequency response as illustrated in FIG. 9. However a exemplary preferred implementation of filters 42 and 44 are described later herein.

TABLE II

| | |
|---|---|
| h(0) = −0.025288315 = h(47) | h(12) = 0.007874526 = h(35) |
| h(1) = −0.034167931 = h(46) | h(13) = 0.084368728 = h(34) |
| h(2) = −0.035752323 = h(45) | h(14) = 0.126869306 = h(33) |
| h(3) = −0.016733702 = h(44) | h(15) = 0.094528345 = h(32) |
| h(4) = 0.021602514 = h(43) | h(16) = −0.012839661 = h(31) |
| h(5) = 0.064938487 = h(42) | h(17) = −0.143477028 = h(30) |
| h(6) = 0.091002137 = h(41) | h(18) = −0.211829088 = h(29) |
| h(7) = 0.081894974 = h(40) | h(19) = −0.140513128 = h(28) |
| h(8) = 0.037071157 = h(39) | h(20) = 0.094601918 = h(27) |
| h(9) = −0.021998074 = h(38) | h(21) = 0.441387140 = h(26) |
| h(10) = −0.060716277 = h(37) | h(22) = 0.785875640 = h(25) |
| h(11) = −0.051178658 = h(36) | h(23) = 1.0 = h(24) |

The binary '0' and '1' inputs to digital filters 42 and 44, generated by the PN spreading functions, are mapped into +1 and −1, respectively. The sampling frequency of the digital filter is 4.9152 MHz=4×1.2288 MHz. An additional binary '0' and '1' input sequence synchronous with the I and Q digital waveforms are provided to each of digital filters 42 and 44. This particular sequence, referred to as a masking sequence, is the output generated by a data burst randomizer. The masking sequence multiplies the I and Q binary waveforms to produce a ternary input of (−1, 0, and +1) to digital filters 42 and 44.

As discussed previously the data rate for transmission on the reverse traffic channel is at one of the rates of 9.6, 4.8, 2.4, or 1.2 kbps and varies on a frame-by-frame basis. Since the frames are of a fixed 20 msec. length for both the access channel and the reverse traffic channel, the number of information bits per frame shall be 192, 96, 48, or 24 for transmission at data rates of 9.6, 4.8, 2.4, or 1.2 kbps, respectively. As described previously, the information is encoded using a rate ⅓ convolutional encoder. The code symbols are repeated to provide a constant code symbol rate of 28,800 symbols per second (sps). This 28,800 sps stream is block interleaved as previously described.

Prior to transmission, the Reverse Traffic Channel interleaver output stream is gated with a time filter that allows transmission of certain interleaver output symbols and deletion of others. The duty cycle of the transmission gate thus varies with the transmit data rate. When the transmit data rate is 9.6 kbps, the transmission gate allows all interleaver output symbols to be transmitted. When the transmit data rate is 4.8 kbps, the transmission gate allows one-half of the interleaver output symbols to be transmitted, and so forth. The gating process operates by dividing the 20 msec. frame into 16 equal length (i.e., 1.25 msec.) periods, called power control groups. Certain power control groups are gated on (i.e., transmitted), while other groups are gated off (i.e., not transmitted).

The assignment of gated-on and gated-off groups is referred to as a data burst randomizer function. The gated-on power control groups are pseudo-randomized in their positions within the frame so that the actual traffic load on the reverse CDMA channel is averaged, assuming a random distribution of the flames for each duty cycle. The gated-on power control groups are such that every code symbol input to the repetition process shah be transmitted once. During the gated-off periods, the mobile station does not transmit energy, thus reducing the interference to other mobile stations operating on the same reverse CDMA channel. This symbol gating occurs prior to transmission filtering.

The transmission gating process is not used when the mobile station transmits on the access channel. When transmitting on the access channel, the code symbols are repeated once (each symbol occurs twice) prior to transmission.

In the implementation of the data burst randomizer function, data burst randomizer logic 46 generates a masking stream of 0's and 1's that randomly mask out the redundant data generated by the code repetition. The masking stream pattern is determined by the frame data rate and by a block of 14 bits taken from the long code sequence generated by generator 30. These mask bits are synchronized with the data flow and the data is selectively masked by these bits through the operation of the digital filters 42 and 44. Within logic 46 the last 14 bits occurring in the next-to-last power control group of each reverse traffic channel frame boundary are stored. Logic 46 uses this data along with the rate input from microprocessor 18, to determine, according to a predetermined algorithm, the particular power control groups in which the data is to be allowed to pass through filters 42 and 44 for transmission. Logic 46 thus outputs for each power control group a '1' or '0' for the entire power control group depending on whether the data is to be filtered out or passed through. At the corresponding receiver, which also uses the same long code sequence and a corresponding rate determined for the frame, logic is provided which determines the appropriate power control groups in which the data is present.

The 14 bits of the long code sequence stored in logic 46 used in determining the power control groups in which data is present for transmission as identified as follows:

$b_0 \ b_1 \ b_2 \ b_3 \ b_4 \ b_5 \ b_6 \ b_7 \ b_8 \ b_9 \ b_{10} b_{11} \ b_{12} \ b_{13}$, where $b_0$ represents the oldest generated bit in the 14-bit sequence, and $b_{13}$ represents the most recently generated bit in the 14-bit sequence.

Each 20 msec reverse traffic channel frame is divided into 16 equal length (i.e., 1.25 msec.) power control groups numbered from 0 to 15 as shown in FIGS. 10a–10d. Data burst randomizer logic 46 implements an algorithm which permits data to be transmitted for the various power control groups for the various rates. It should be noted that in order to randomize the position of the data within the transmission frame that only 8 bits are necessary. However as disclosed herein, 14 bits are used to assure that the slot position within the frame (power control group) for data transmission at quarter rate is a subset of the slots (power control groups) used at the half rate, and that the slots used for data transmission at eighth rate is a subset of the slots used at the quarter rate.

FIG. 10e illustrates that the 14 bits from the masked long code that are stored correspond to the last 14 bits of the 15th power control group (PCG 14) of the 16 power control groups of the preceding frame. The 15th power control group is used to provide sufficient time to determine the power control groups in which data is transmitted in the following frame. However it should be understood that any predetermined bits of PN data could be used in determining the power control groups of the current frame for data transmission. Although it is desirable to use the long code sequence in determining the power control groups in which data transmission is to occur, since this sequence is also used at the receiver for PN, other deterministic sequences may be used for power control group determination. In this instance any other deterministic sequence may be used which is also know by the receiver. Thus the sequence used in computing the power control groups may be independent of the sequence used to PN spread the user data.

As illustrated in FIGS. 10a–10d within the 1.25 msec. time period of each transmitted power control group within the frame there are 12 data bits encoded as 36 code symbols which are in turn encoded as 6 Walsh symbols. With each Walsh symbol represented by 64 Walsh chips there are 384 Walsh chips within the 1.25 msec. time period. Since there are 4 PN chips for every Walsh chip, each transmitted power control group is comprised of data modulated by 1536 PN chips.

For full rate data, data is transmitted in each power control group. However, for rates less than full rate, the value of the selected bits $b_0$–$b_{13}$ is used to determine the power control groups in which data is transmitted. The power control groups used for transmission for the various rates are as follows:

Data Rate Selected—Full Rate

Transmission shall occur on power control groups numbered:

0, 1, 2, 3, 4, 5, 6, 7, 8, 9, 10, 11, 12, 13, 14, 15.

Data Rate Selected—Half Rate

Transmission shall occur on eight power control groups numbered:

$b_0$, 2+$b_1$, 4+$b_2$, 6+$b_3$, 8+$b_4$, 10+$b_5$, 12+$b_6$, and 14+$b_7$.

Data Rate Selected—Quarter Rate

Transmission shall occur on four power control groups numbered:

$b_0$ if $b_8$=0 or 2+$b_1$ if $b_8$=1;
4+$b_2$ if $b_9$=0 or 6+$b_3$ if $b_9$=1;
8+$b_4$ if $b_{10}$=0 or 10+$b_5$ if $b_{10}$=1; and
12+$b_6$ if $b_{11}$=0 or 14+$b_7$ if $b_{11}$=1.

Data Rate Selected—One-Eighth Rate

Transmission shall occur on two power control groups numbered:

$b_0$ if ($b_8$=0 and $b_{12}$=0), or 2+$b_1$ if ($b_8$=1 and $b_{12}$=0) or 4+$b_2$ if ($b_9$=0 and $b_{12}$=1), or 6+$b_3$ if ($b_9$1 and $b_{12}$=1); and 8+$b_4$ if ($b_{10}$=0 and $b_{13}$=0), or 10+$b_5$ if ($b_{10}$=1 and $b_{13}$=0)
12+$b_6$ if ($b_{11}$0 and $b_{13}$=1), or 14+$b_7$ if ($b_{11}$=1 and $b_{13}$=1).

FIGS. 10a–10d, in conjunction with FIG. 10e, illustrate by example the power control groups selected for the various rates for an exemplary $b_0$–$b_{13}$ bit sequence. It should be understood that since data for each frame is transmitted at only one rate in the actual implementation, data would be transmitted according to only one of FIGS. 10a–10d for the particular frame. In the example illustrated in FIGS. 10a–10e, an exemplary $b_0$–$b_{13}$ bit sequence of (0, 0, 1, 0, 1, 1, 0, 1, 1, 0, 0, 1, 0, 0) is used. Using the algorithms set forth above for each data rate, data would be transmitted in the power control groups shaded for the corresponding transmission rate. As can be seen in FIGS. 10b–10d, the selected power control groups of the lower rates are subsets of selected power control groups of higher rates. The use of subsets provides for ease in decoding of the frame for each of the various rates.

Logic 46 also generates an output TX_PUNCT signal to the RF transmitter circuit described later on herein. This signal is used to turn on the transmitter power amplifier for power control groups that are to be transmitted and off for power control groups that are not transmitted. This control over the power amplifier provides a reduction in power consumption by the transmitter, which is particularly important in portable units.

Figure 11A:
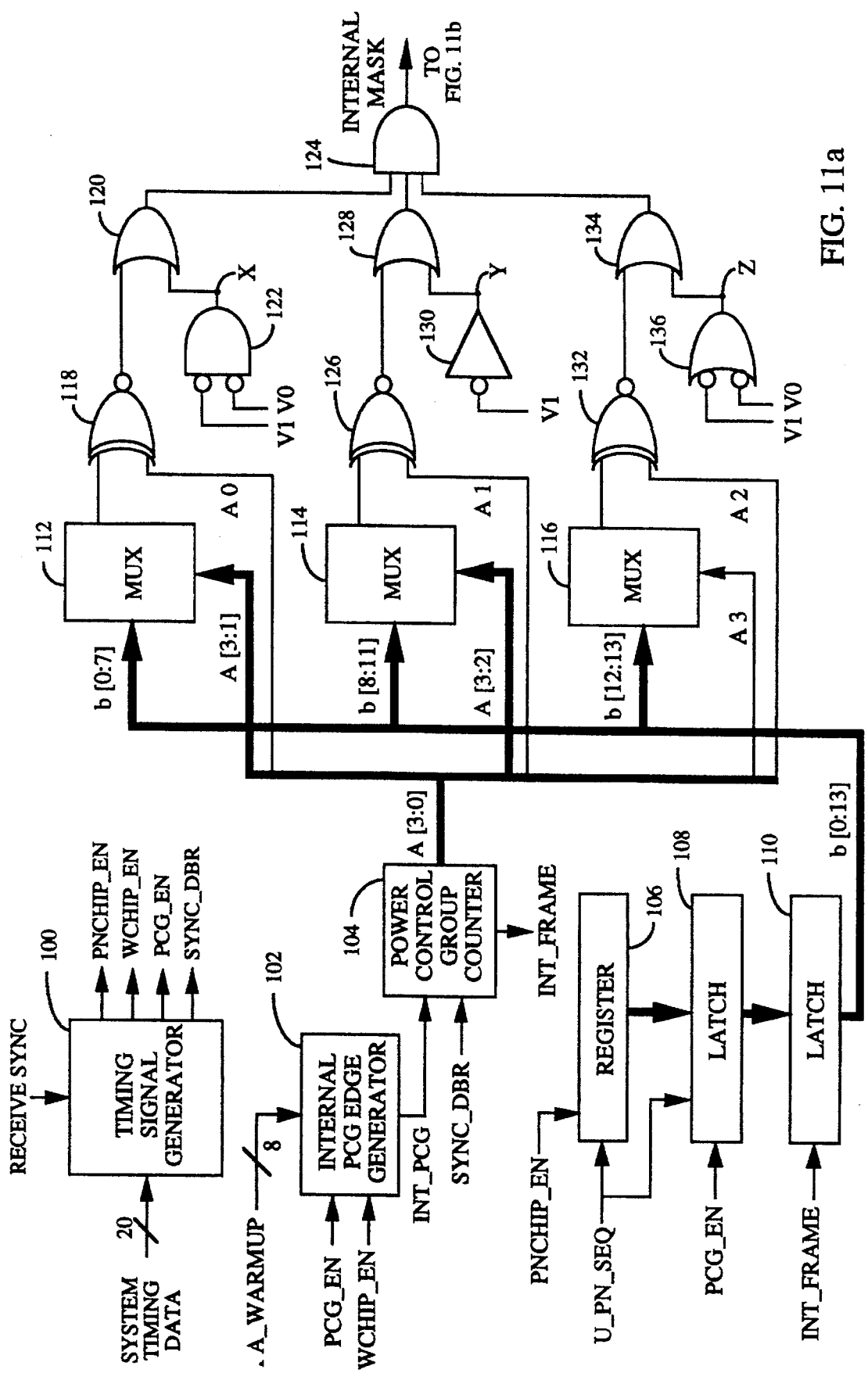
FIGS. 11a–11b illustrate an exemplary circuit diagram for the data burst randomizer logic.

FIG. 11 illustrates in further detail an exemplary implementation of data burst randomizer logic 46. In FIG. 11, logic 46 is comprised of a timing signal generator 100 which receives system timing data from microprocessor 18 (FIG. 1). Generator 18 also receives every 80 msec. a receive frame sync signal from the receiver demodulator. This receive frame sync signal occurs every four data frames and is used with the system timing data to align the transmitted data frames with the received data frames. Generator 100 uses the system timing data and the receive frame sync signal to generate various timing signals. One such signal is a 1.2288 MHz PNCHIP_EN timing signal to which the long code PN spread data is synchronized. Another generated timing signal is the 307.2 kHz WCHIP_EN timing signal to which the Walsh chip data is synchronized. Also generated is a PCG_EN signal which occurs every 1.25 msec., specifically at the beginning of each power control group. Further generated is a SYNC_DBR signal which occurs one power control group before the beginning of a frame.

As mentioned previously the TX_PUNCT signal is used to turn on and off the power amplifier. The TX_PUNCT signal is computed for a following power control group during a current power control group using the stored PN bits $b_0$–$b_{13}$. This precalculation of the TX_PUNCT signal permits the power amplifier to be turned on or off, prior to the following power control group to permit data to be transmitted or not. The length of time for which the power amplifier is turned on, if currently off, prior to the next power control group in which a transmission is to occur is a function of the value of the PA_WARMUP signal provided by the microprocessor.

In order to support this operation, logic 46 includes internal power control group edge generator 102 which receives the PA_WARMUP signal, the PCG_EN signal and the WCHIP_EN signal. Generator 102 provides, in response to the concurrent PCG_EN signal and the WCHIP_EN signals, an INT_PCG signal which is the PCG_EN signal delayed according to the value of the PA_WARMUP signal. The PCG_EN signal in essence demarks a data burst randomizer internal power control group frame boundary with skewed timing to demark the beginning of a transmitter power amplifier turn on warmup period should data need to be transmitted in the next power control group.

In order to keep track of the power control groups for each frame, a power control group counter 104 is provided. Counter 104 is a 4-bit binary counter which in response to the INT_PCG signal provides a binary number corresponding to the number assigned to each power control group for the frame. The output bits of counter 104 are the bits $A_0$–$A_3$, with the bits $A_3$ and $A_0$, respectively being the most and least significant bits of the output 4-bit value. Counter 104 also receives the SYNC_DBR signal which resets the counter at the beginning of the frame. Counter 104 also generates, in synchronization with the INT_PCG signal in the last power control group of a frame, an INT_FRAME signal. It should be noted that since counter 104 is synchronized to change state in response to the INT_PCG signal the bits $A_0$–$A_3$, which are representative of the power control group number, are output in advance of the actual occurrence of the corresponding power control group boundary. In the exemplary implementation the counter value changes state during the previous power control group to which it identifies at a time delayed from the beginning of the previous power control group. The delay in the change in counter state is the value set according to the signal PA_WARMUP. Also, since the INT_FRAME signal is in synchronization with the INT_PCG signal the INT_FRAME occurs in the last power control group at a time delayed from the beginning of the power control group by a time period determined by the PA_WARMUP signal. Thus INT_PCG and INT_FRAME are signals which define internal power control group and frame timing.

The 1.2288 MHz masked long code PN sequence, the signal U_PN_SEQ generated by the circuit illustrated in FIG. 7, is provided as a serial input to a 13-bit shift register 106 along with the PNCHIP_EN signal. The PNCHIP_EN signal is used to clock the shift register 106 at the 1.2288 MHz clock rate. The data in register 106 along with the current PN sequence bit are also provided to a 14-bit register or latch 108. At the beginning of a power control group the bits stored in register 106 (now defined as the randomizing data bits $b_0$–$b_{12}$) along with the current PN sequence bit (randomizing data bit $b_{13}$) are stored in latch 108 in response to the PCG_EN signal. It should be understood that in the exemplary implementation, the direct input of the current PN sequence bit to latch 108 requires that only a 13-bit shift register be used. A 14-bit shift register could be equally used with only the content of the shift register provided to latch 108. However in this alternative configuration a slight modification in timing would be required to ensure the proper data is stored for later usage. Further logic implementations may be readily devised to properly latch $b_0$–$b_{13}$ data.

The randomizing data is provided to a second register or latch 110, which is a 14-bit register, along with an INT_FRAME signal. In response to the INT_FRAME signal the data is stored in latch 110 with the data re-synchronized to an internal frame boundary. Various bits of the data stored latch 110 are provided to multiplexers 112, 114 and 116 for use in generating the masking stream referred to as the INTERNAL MASK data. Also provided to multiplexers 112, 114 and 116 are various bits output from power control group counter 104.

Multiplexer 112 is a 1-bit 8:1 multiplexer which has eight data inputs for receiving the bits $b_0$–$b_7$ in parallel. Multiplexer 112 has three selector inputs for receiving the input counter bits $A_3$–$A_1$ for selecting one of the eight input data bits as the output bit in accordance with Table III as follows:

TABLE III

| COUNTER BITS | | | MULTIPLEXER |
|---|---|---|---|
| $A_3$ | $A_2$ | $A_1$ | OUTPUT BIT |
| 0 | 0 | 0 | $b_0$ |
| 0 | 0 | 1 | $b_1$ |
| 0 | 1 | 0 | $b_2$ |
| 0 | 1 | 1 | $b_3$ |
| 1 | 0 | 0 | $b_4$ |
| 1 | 0 | 1 | $b_5$ |
| 1 | 1 | 0 | $b_6$ |
| 1 | 1 | 1 | $b_7$ |

The bit output from multiplexer 112 is provided to one input of exclusive-NOR gate 118 while the other input to gate 118 is the bit $A_0$. The output of gate 118 is provided to one input of OR gate 120 with the other input of gate 120 provided from the output of NOR gate 122. The inputs to gate 122 are the bits $V_1$ and $V_0$ provided from the microprocessor which are indicative of the data rate for the frame. The output from gate 120 is provided as one input to AND gate 124. Table IV provides the values of the bits $V_1$ and $V_0$ for the various rates and the values at the nodes X, Y and Z as illustrated in FIG. 11.

TABLE IV

| RATE | BIT $V_1$ | BIT $V_0$ | NODE X | NODE Y | NODE Z |
|---|---|---|---|---|---|
| FULL (9.6 kbps) | 0 | 0 | 1 | 1 | 1 |
| HALF (4.8 kbps) | 0 | 1 | 0 | 1 | 1 |
| QUARTER (2.4 kbps) | 1 | 0 | 0 | 0 | 1 |
| EIGHTH (1.2 kbps) | 1 | 1 | 0 | 0 | 0 |

Multiplexer 114 is a 1-bit 4:1 multiplexer which has four data inputs for receiving the bits $b_8$–$b_{11}$ in parallel. Multiplexer 114 has two selector inputs for receiving the input counter bits $A_3$–$A_2$ for selecting one of the four input data bits as the output bit in accordance with Table V as follows:

TABLE V

| COUNTER BITS | | MULTIPLEXER |
|---|---|---|
| $A_3$ | $A_2$ | OUTPUT BIT |
| 0 | 0 | $b_8$ |
| 0 | 1 | $b_9$ |
| 1 | 0 | $b_{10}$ |
| 1 | 1 | $b_{11}$ |

The bit output from multiplexer 114 is provided to one input of exclusive-NOR gate 126 while the other input to gate 126 is the bit $A_2$. The output of gate 126 is provided to one input of OR gate 128 with the other input of gate 128 provided from the output of an inverting gate or inverter 130. The input to inverter 130 is the bit $V_1$ provided from the microprocessor. The output from gate 128 is provided as another input to AND gate 124.

Multiplexer 116 is a 1-bit 2:1 multiplexer which has two data inputs for receiving the bits $b_{12}$–$b_{13}$ in parallel. Multiplexer 116 has two selector inputs for receiving the input counter bit $A_3$ for selecting of one the two input data bits as the output bit in accordance with Table VI as follows:

TABLE VI

| COUNTER BIT A3 | MULTIPLEXER OUTPUT BIT |
|---|---|
| 0 | $b_{12}$ |
| 1 | $b_{13}$ |

The bit output from multiplexer 116 is provided to one input of exclusive-NOR gate 132 while the other input to gate 132 is the bit $A_2$. The output of gate 132 is provided to one input of OR gate 134 with the other input of gate 134 provided from the output of NAND gate 136. The input to gate 136 are the bits $V_1$ and $V_0$ provided from the microprocessor. The output from gate 134 is provided as the final input to AND gate 124.

The output from gate 124 is the masking stream identified by the signal INTERNAL MASK. The signal INTERNAL MASK is provided through output logic as described below.

It should be noted that the output from counter 104 provides several functions. The output of counter 104 indicates the current power control group in the frame. First of all, the counter output is used to select which bits of latch 110 are output from multiplexers 112, 114 and 116.

Secondly, the output is compared with the selected bit, and if a match occurs, a "true" value is passed on to the corresponding OR gate 120, 128 and 134. The rate logic, which performs logical operations on the rate bits from the microprocessor, provides an output to the other input of each of OR gates 120, 128 and 134. The input value to OR gates 120, 128 and 134 either allows the value from each of exclusive-NOR gates 118, 126 and 132 to pass on, or overrides this value by passing a "true" value, depending on the vocoder rate.

An example of the process of generating the INTERNAL MASK signal is as follows. As illustrated in FIGS. 10a–10d, with respect to FIG. 10e, stored in latch 110 are the values $b_0$–$b_{13}$, where $(b_0, b_1, b_2, \ldots b_{13})$=(0 0 1 0 1 1 0 1 1 0 0 1 0 0). If the data rate is full, or rate 1, then all three OR gates 120, 128 and 134 produce a "true" value (since nodes X, Y, and Z each equal 1), regardless of the state of counter 104 and the value of the data in latch 110. With the three inputs to AND gate 124 always true, all slots are selected for the full rate operation as illustrated in FIG. 10a.

If the data rate is half, then OR gate 120 passes only the data from exclusive-NOR gate 118, while OR gates 128 and 134 pass a true value (since node X equals 0 and nodes Y and Z each equal 1) to AND gate 124. As counter 104 increments through the sixteen states $b_0$ is selected for the first two slots, then $b_1$ is selected for the next two slots, and so on. The value of the counter bit $A_0$ is compared with the selected latch value, so for the first slot with $A_0$=0 and $b_0$=0 the output of exclusive-NOR gate 118 is "1". During the second slot $A_0$=1 is compared with $b_0$=0 and the output of exclusive-OR gate 118 is '0'. From this implementation, for every two slots one will be selected to permit data to be transmitted.

Similar is the scheme for quarter rate data where OR gates 120 and 128 pass the data respectively from exclusive-NOR gates 118 and 126, while OR gate 134 passes a true value (since nodes X and Y equal 0 and node Z each equals 1) to AND gate 124. One slot of each set of four slots are 5 selected by the combined action of multiplexer 114/ exclusive-NOR gate 126/OR gate 128 and multiplexer 112/ exclusive-NOR gate 118/OR gate 120.

A similar scheme is used for eighth rate data where OR gates 120, 128 and 134 pass the data respectively from exclusive-NOR gates 118, 126 and 132 (since nodes X, Y and node Z each equal 0) to AND gate 124. One slot of each set of eight slots is selected by the logic.

As mentioned previously, access channel data even though transmitted at 4.8 kbps (half rate) is treated as if it were 9.6 kbps data (full rate). The microprocessor may simply provide to logic 46 bits $V_1$ and $V_0$ at a value which corresponds to a full rate frame so that the data is not masked.

Figure 11B:
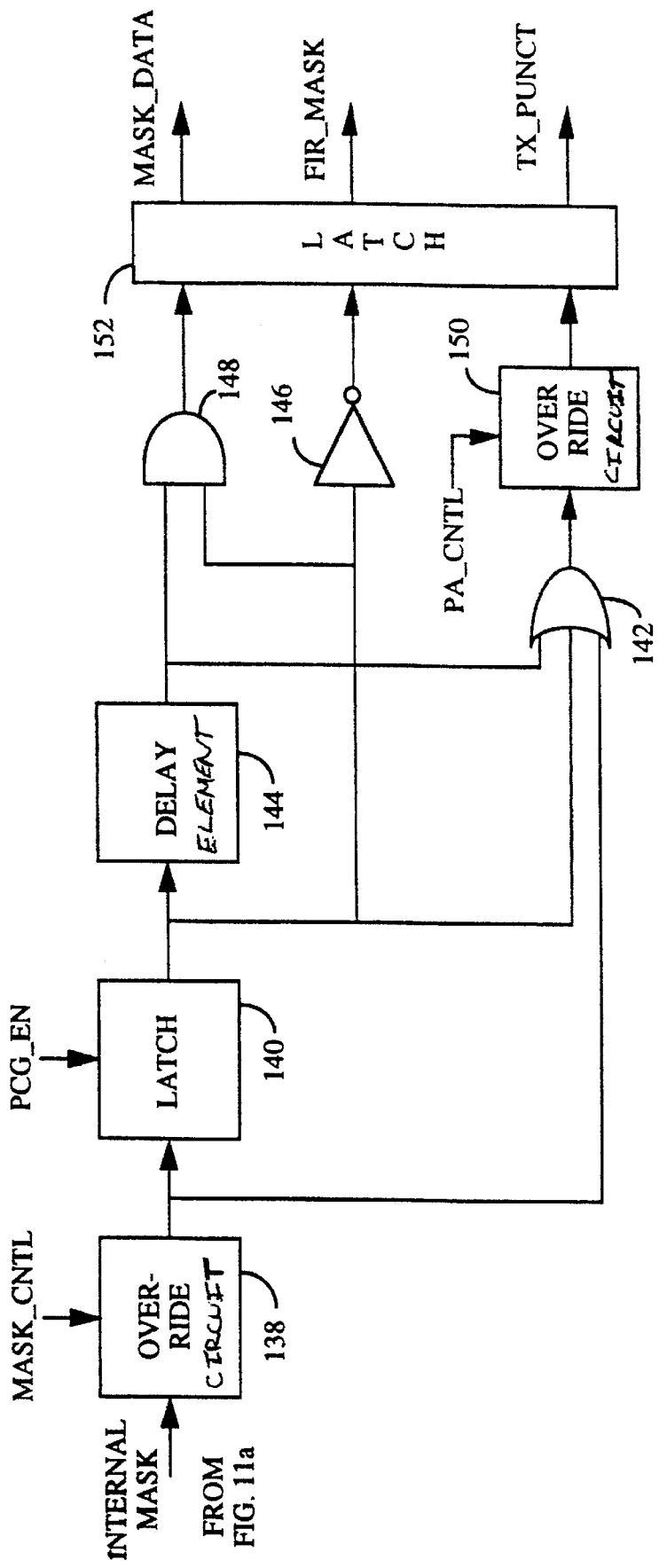

The INTERNAL MASK signal is provided to the output logic where three output signals are generated as illustrated in FIG. 11b. The INTERNAL MASK signal as output from gate 124 is input to override logic 138. In logic 138 the INTERNAL MASK signal can be forced high or low by a MASK_CNTL signal which is synchronized to the INT_FRAME signal. The INTERNAL MASK signal output from logic 138 is provided as an input to latch 140 and to one input of OR gate 142. The input to latch 140 is stored therein in response to the PCG_EN signal also input thereto. The INTERNAL MASK signal is thus resynchronized with the power control group frame boundary by latch 140. The INTERNAL MASK signal is output from latch 140 to delay element 144, inverter 146, one input of AND gate 148, and to another input of OR gate 142. Delay element 144 provides a 15 μsec. delay, approximately 20 PN chips, to the INTERNAL MASK signal for reasons discussed later. The output of delay element 144 is provided to the other input of AND gate 148 and to a last input of OR gate 142.

The output from OR gate 142 is provided to override logic 150 which also receives the signal PA_CNTL. The signal PA_CNTL which is synchronized with the INT_FRAME signal can be used to force the TX_PUNCT signal either high or low, as the output from OR gate 142. The output from logic 150 is provided to latch 152 where output as the TX_PUNCT signal.

AND gate 148 has another input for receiving the output from latch 140. The output of AND gate 148, the result of the AND operation on the delayed INTERNAL MASK signal and the current PCG_EN synchronized INTERNAL MASK signal, is the signal MASK_DATA which is provided to latch 152. The output of inverter 146, which is the inverted version of the PCG_EN synchronized INTERNAL MASK signal and referred to as the FIR_MASK signal, is also provided to latch 152. Inverter 146 causes the data to be transmitted when FIR_MASK is '0' and not transmitted when '1'. Latch 152 receives a clock signal for storing each of the signals MASK_DATA, FIR_MASK and TX_PUNCT. As mentioned previously the TX_PUNCT signal is used to turn on and off the power amplifier. The signal FIR_MASK is the masking stream that is provided to the FIR filters for data masking purposes. The signal MASK_DATA is used in the demodulation circuitry and also in the RF analog circuitry for various purposes.

Figure 12:
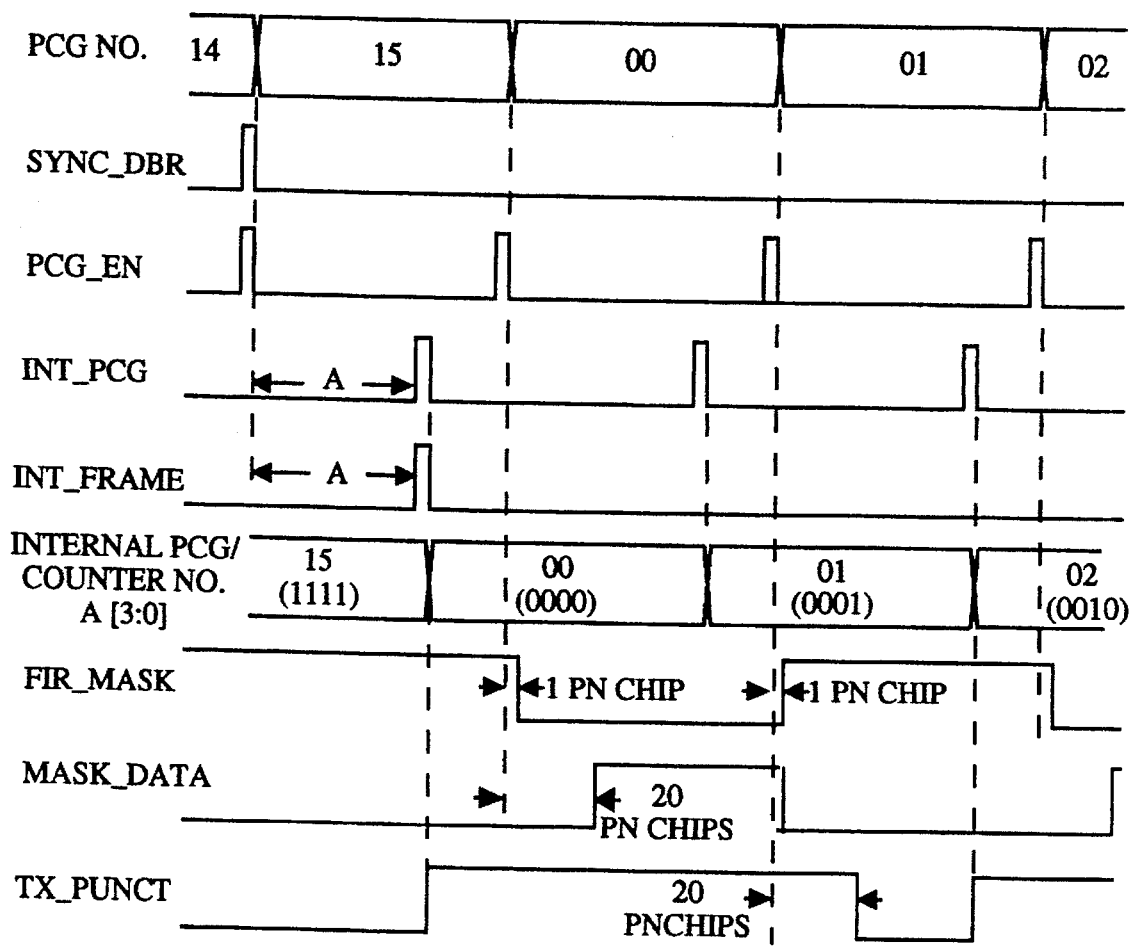
FIG. 12 is an exemplary timing diagram for various signals associated with the logic of FIGS. 11a–11b.

FIG. 12 illustrates an exemplary timing diagram for logic 46 of FIG. 11. As can be seen form FIG. 12, changes in state for the logic of exemplary embodiment are made on a pulse falling edge for the signals SYNC_DBR, PCG_EN, INT_PCG, INT_FRAME. The 14-bit value from latch 108 is latched in latch 110 upon the falling edge of the INT_FRAME signal. The signal SYNC_DBR is produced only once in each frame at one power control group before the beginning of the next frame. The signal PCG_EN is produced for each power control group. The signal INT_FRAME is produced only once in each frame delayed from the signal SYNC_DBP, by the PA_WARMUP value. Similarly the signal INT_PCG is produced for each power control group delayed from the corresponding signal PCG_EN by the PA_WARMUP value.

The signals INT_PCG and INT_FRAME are the next signals to fire, delayed by the value of PA_WARMUP from a power control group boundary with the delay indicated by the time period A. If the following power control group is to be transmitted as determined by the value of the signal INTERNAL MASK, the signal TX_PUNCT will rise upon the falling edge of the INT_PCG signal. Upon the boundary of the next power control group the signal FIR_MASK will fire low, delayed by one PN chip. When the signal FIR_MASK is low, data will be transmitted. The signal MASK_DATA will fire 20 PN chips, slightly over 15 μsec., after the power control group boundary. The FIR_MASK signal will rise one PN chip after the following PCG_EN signal, thereby inhibiting data transmission, along with the MASK_DATA falling. The TX_PUNCT signal remains high for 20 PN chips after the PCG_EN signal falls. This 20 PN chip time period provides a 15 msec. plus one PN chip time to allow for data propagation through the rest of the data transmission circuitry. The delay ensures that the power amplifier remains on a slight time period after the power control group ends.

Figure 13:
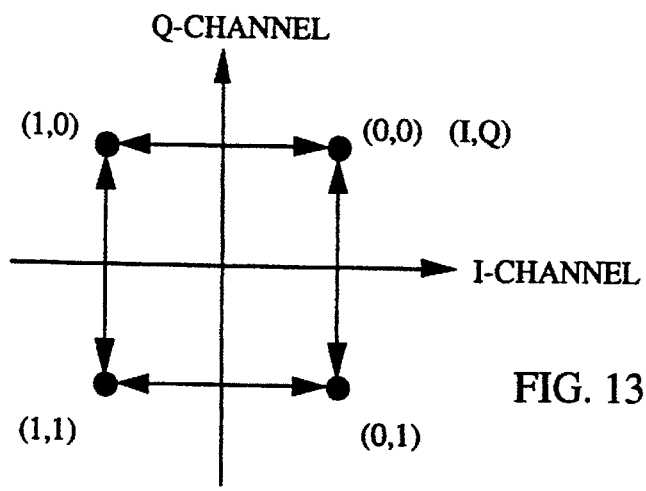
FIG. 13 is graph illustrating the channel signal constellation.

The FIR_MASK signal is provided to each of I and Q FIR filters 42 and 44. Further details of the implementation of filters 42 and 44 are illustrated in FIG. 14. The FIR filter is symmetrical with 48-taps. As mentioned previously the sampling frequency of the digital filter is four times the PN chip rate, i.e. 4·1.2288 MHz =4.9152 MHz. The binary values of 0 and 1 of the input I and Q waveforms are mapped into +1 and −1 respectively. As these values enter the filter they are gated by the FIR_MASK signal. This gating process produces the ternary values of −1, 0 and +1. The resulting signal space trajectories are shown in FIG. 13. One can think of the FIR_MASK signal as being the "magnitude", and the input I and Q values as being the "sign". As these bits pass through the 48 stages of the filter they get "multiplied" by the coefficients corresponding to each stage with 10-bit accuracy. The results of these multiplications are then summed and truncated at the output to produce one 8-bit value per filter sample.

In FIG. 14, filters 42 and 44 are each comprised of a counter 160 which provides a 2-bit counter value ($C_1$ $C_0$). Counter 160 changes state at the rate of the input clock signal (CLK) which is at four times the PN chip rate. Counter 160 is also responsive to the PNCHIP_EN signal to ensure proper resetting of the counter. The 2-bit counter output value ($C_1$ $C_0$) is provided to sequence generator 162 which generates a 16-bit output ($g_0$–$g_{15}$) for each of the four values of the counter ($C_1C_0$) input. Table VII describes through a series of functions the value of each bit as output from generator 160 as a function of the values ($C_1$ $C_0$).

TABLE VII

| | |
|---|---|
| g0 = 0 | g8 = $C_1 \wedge C_0$ |
| g1 = $\overline{C_1} \wedge \overline{C_0}$ | g9 = ($\overline{C_1} \wedge \overline{C_0}$) v ($C_1 \wedge C_0$) |
| g2 = $\overline{C_1} \wedge C_0$ | g10 = $C_0$ |
| g3 = $\overline{C_1}$ | g11 = $\overline{C_1}$ v $C_0$ |
| g4 = $C_1 \wedge \overline{C_0}$ | g12 = $C_1$ |
| g5 = $\overline{C_0}$ | g13 = $C_1$ v $\overline{C_0}$ |
| g6 = ($C_1 \wedge \overline{C_0}$) v ($\overline{C_1} \wedge C_0$) | g14 = $C_1$ v $C_0$ |
| g7 = $\overline{C_1}$ v $\overline{C_0}$ | g15 = 1 |

Each bit in the 16-bit output of generator 162 is provided as one input to a different exclusive-OR gate. Input to the other input of each exclusive-OR gate is the chip data (CHIP) output from a respective one of exclusive-OR gates 34 and 36 (FIG. 1). In FIG. 14, for purposes of illustration, the exclusive-OR gates which receive the chip data and the $g_m$ function bit are illustrated as being a single 16-bit exclusive-OR gate 164 which provides a corresponding 16-bit output. Each output bit is provided as one input to a different AND gate. Input to the other input of each AND gate is the signal $\overline{FIR\_MASK}$ from logic 46 (FIG. 1). The signal FIR_MASK is inverted by inverter 166 so as to provide the signal $\overline{FIR\_MASK}$. As before, for purposes of illustration, the AND gates which receive the signal $\overline{FIR\_MASK}$ and the $g_m$ function bits are illustrated as being a single 16-bit AND gate 168 which provides a corresponding 16-bit output of function bits $f_m$. Each bit $f_m$ corresponds to a bit $g_m$ in accordance with the logic statement:

$$f_m = (g_m \oplus CHIP) \overline{FIR\_MASK}. \quad (7)$$

The 16-bit output of function bits $f_m$ are provided to a series of interconnect logic circuits 170. Interconnect logic circuits $170_{11}$–$170_0$ provide for each of the four values of ($C_1$ $C_0$) which produce the function values $f_m$ a different 10-bit coefficient value COEFF(N). As presented previously in Table II, h(n) is the impulse response of the filters. Table VII/provides a coefficient mapping for the various values of ($C_1$ $C_0$), FIR_MASK, and CHIP, where CHIP is the I or Q spread data chip.

TABLE VIII

| FIR_MASK | CHIP | $C_1$ | $C_0$ | COEFF(N)[9:0] |
|---|---|---|---|---|
| 0 | 0 | 0 | 0 | h(4N) |
| 0 | 0 | 0 | 1 | h(4N + 1) |
| 0 | 0 | 1 | 0 | h(4N + 2) |
| 0 | 0 | 1 | 1 | h(4N + 3) |
| 0 | 1 | 0 | 0 | $\overline{h(4N)}$ |
| 0 | 1 | 0 | 1 | $\overline{h(4N + 1)}$ |
| 0 | 1 | 1 | 0 | $\overline{h(4N + 2)}$ |
| 0 | 1 | 1 | 1 | $\overline{h(4N + 3)}$ |
| 1 | X | X | X | 0 |

Figure 15:
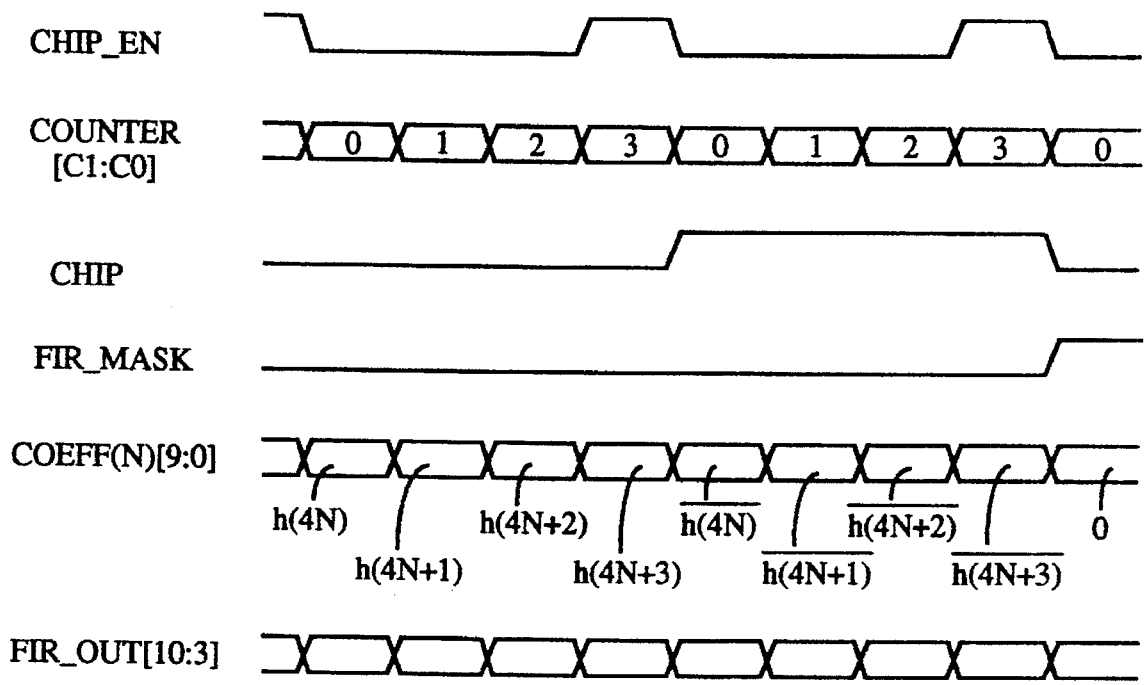
FIG. 15 is a timing diagram for the FIR filter of FIG. 14.

For example with FIR_MASK and CHIP both equal to 0, interconnect logic circuit $170_{11}$ for the counter value ($C_1$ $C_0$) of (0 0) produces the 10-bit coefficient value h(44). Similarly for the counter value of (0 1), (1 0 ) and (1 1) the 10-bit coefficient values h(45), h(46) and h(47) are respectively produced. Should the CHIP signal equal '1' the logical inverse of the coefficient values are provided. Should the PN_MASK signal equal '1' all values provided as the coefficients are '0' thus masking the input data. FIG. 15 illustrates a timing diagram for the various signals associated with the FIR filters.

In defining the interconnect bit mapping COEFF(N)[I], N is the coefficient group (N=0, 1, 2, . . . 11) and I is the bit in the 10-bit coefficient (I=0, 1, . . . 9). The bit connected to the $f_m$ bit corresponds to the following equation:

$$m = 8h(4N+3)[I] + 4h(4N+2)[I] + 2h(4N+1)[I] + h(4N)[I], \quad (8)$$

where h(n)[I], n=47, 46, . . . 0, and I=0, 1, . . . 9, is bit I of sample n of the impulse response of the FIR filter.

It should be understood that the use of generator 162 in combination with interconnect logic circuits 170 provides an efficient technique for producing the various coefficient values. An alternative memory circuit such a Read Only Memory (ROM) may be implemented for storing and providing the coefficient values. The ROM may be of a size sufficient to store all coefficient values, or be of a reduced size sufficient to store certain coefficient values with output logic designed using conventional techniques for constructing from the stored coefficient values all necessary coefficient values. In any case the values of the coefficients for the present implementation of the FIR filters are disclosed in Table II.

The coefficient values output from interconnect logic circuits 170 are provided to a respective adder 172. Another input to each of adders 172 is provided through AND gate 174 whose inputs are the signals CHIP and $\overline{FIR\_MASK}$. The output of AND gate 174 is provided to the adders as the least significant bit and is used in conjunction with the logical inverse of the coefficient groups to provide the arithmetic inverse of the filter coefficient. As is well known in the art, logically inverting a 2's complement number and adding a '1' to the result will generate the arithmetic inverse of the number.

The 11-bit output from each of adders 172 is clocked at the CLK signal rate, which is four times the PN chip rate, through a series of four 11-bit delay elements or registers $176_1$–$176_4$ for input to the next adder (adder $172_{10}$). The output from the last adder, adder $172_0$, is provided through a final delay element 178. In the 11-bit output from delay element 178 the three least significant bits are dropped with the remaining 8 bits provided for digital to analog conversion.

Referring back to FIG. 1, the I channel data output from filter 42 is provided directly to a digital to analog (D/A)

converter and anti-aliasing filter circuit 50. The Q channel data however is output from filter 44 to a delay element 48 which introduces a one-half PN chip time delay (406.9 nsec.) in the Q channel data. The Q channel data is output from delay element 48 to digital to analog (D/A) converter and anti-aliasing filter circuit 52. Circuits 50 and 52 convert the digital data to analog form and filter the analog signal. The signals output from circuits 50 and 52 are provided to Offset Quadrature Phase Shift Key (OQPSK) modulator 54 whose modulated signal is output to RF transmitter 56. Transmitter 56 includes in addition to power amplifier 58, various other amplifiers, filters and frequency upconverters (not shown) as is well known in the art for preparing the baseband signal for transmission. The signal is output from transmitter 56 to antenna 60 for communication to the base station.

It should be understood that the exemplary embodiment of the present invention discusses the use of data repetition for data at rates less than full rate. The present invention is also applicable with respect to those cases where data repetition is not used. In the case where no data repetition is used, delays in the presentation of data may be used to position the data within the data frame. For example, the data randomizer logic may control the output of the interleaver data (where no data repeates are stored) for modulation and filtering by a conventional HR filter.

Other implementations also include the use of randomizing data whether encoded or not, interleaved or not, or digital filtered or not. Where techniques other than digital filtering are used, such as in the case of analog filtering of the signal, the randomizer logic may be used to select the frame slot in which data is to be transmitted by controlling the power amplifier. Furthermore, in this case the randomizer logic may be used to turn on and off the power amplifier, whether data repetition is used or not. It should be understood that various other specific implementations of the use of data randomization to position the data within the data frame may readily be devised using the basic teachings of the present invention.

Figure 16:
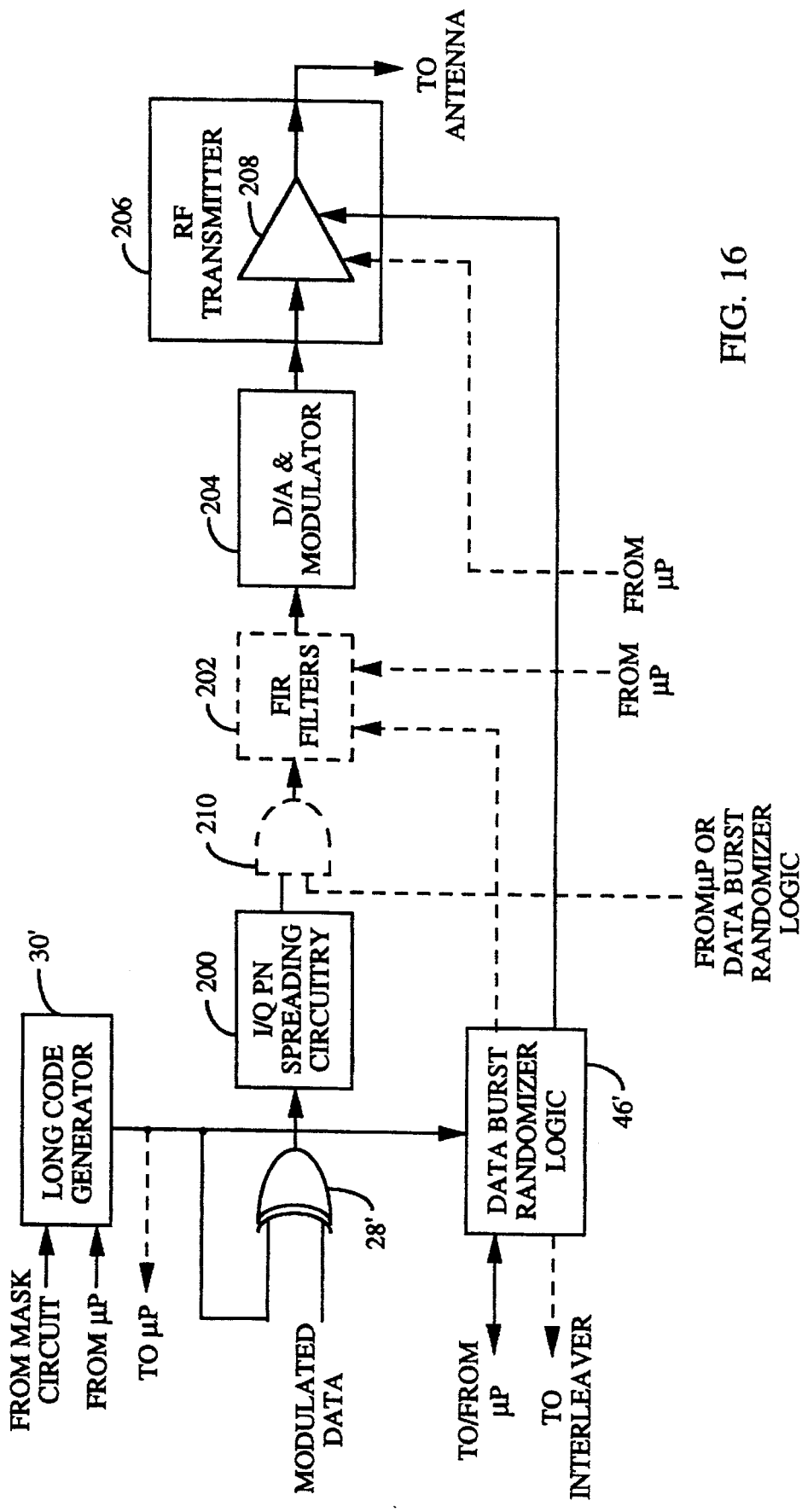
FIG. 16 is an exemplary block diagram of various other circuit implementations for randomizing the position of data within a data frame.

FIG. 16 illustrates in block diagram form several of the various implementations, and modifications thereto, to the present invention. In FIG. 16 modulated data is provided at one input of exclusive-OR gate 28' while the long code sequence is provided at the other input from long code generator 30'.

In a first alternative implementation where data repetition is provided by the interleaver, the output of long code generator 30' is also provided to data burst randomizer logic 46' where the power control group time slots for which the data is to be transmitted are determined. Logic 46' as before receives timing information from the microprocessor and from the receiver, if necessary. Logic 46' may either control the output of data from the interleaver or microprocessor. The long code spread data output from gate 28' is provided to further PN code spreading circuitry 200, where I and Q PN channel spreading is accomplished if desired. The output from circuitry 200 may be provided directly to digital to analog conversion circuitry and modulation circuitry.

Unlike before in the main exemplary embodiment where the FIR filters removed ones of first or repeated sets of the data, the FIR filters may be eliminated with filtering done after digital to analog conversion. Without filters 202, logic 46' may still be used to control turning on and off the power amplifier 208 in RF transmitter 206 to achieve power savings and power control group time slot control. In the alternative logic 46 may simply control through optional logic gate 210 or other well known switching techniques the output of data at the appropriate power control group time slots.

In another alternative implementation where the interleaver still provides data repetition, the function of logic 46' may be incorporated within the microprocessor. In this implementation the long code sequence is output from long code generator 30' to the microprocessor where the power control group time slots for which the data is to be transmitted are determined. The microprocessor may control the FIR filters 202, if provided, or the power amplifier, or both, or through other switching techniques, to permit transmission of the data during the determined power control group time slots.

Another type of alternative implementation may be considered where the interleaver, if provided, does not provide repetition in the data. The output of long code generator 30' is also provided to data burst randomizer logic 46' where the power control group time slots for which the data is to be transmitted are determined. Logic 46' as before receives timing information from the microprocessor and from the receiver, if necessary. Logic 46' may either control the output of data from the interleaver or microprocessor. The long code spread data output from gate 28' is provided to further PN code spreading circuitry 200, where I and Q PN channel spreading is accomplished if desired. The output from circuitry 200 is provided to optional FIR filter circuitry 202. Unlike before where the FIR filters removed ones of a first or repeated sets of the data, the FIR filters function as normal digital filters. Furthermore, filters 202 may be eliminated with filtering done after digital to analog conversion. With or without the filters 202, logic 46' may still be used to control turning on and off the power amplifier 208 in RF transmitter 206 to achiever power savings.

In another alternative implementation where the interleaver if provided does not provide data repetition, the function of logic 46' may be incorporated within the microprocessor. In this implementation the long code sequence is output from long code generator 30' to the microprocessor where the power control group time slots for which the data is to be transmitted are determined. The microprocessor may control the output of data therefrom for the determined power control group. In the alternative the microprocessor may provide the normal output therefrom to the interleaver while controlling the output from the interleaver to place the data in the appropriate power control group time slot. As before the microprocessor may also have control over the power amplifier 208 for power savings, and filters 202 may or may not be provided.

As mentioned previously, other techniques may be used to distribute the data transmission energy throughout the frame. In one alternative technique the data is repeated throughout the frame in a manner discussed above. Rather than positioning the data in the frame by deleting all but one version of the original data or repeated data in the frame, the entire frame may be transmitted at a reduced energy level dependent upon the data repetition for the frame.

Referring back to FIG. 1, microprocessor 18 provides the rate indication to filters 42 and 44 via the signal line indicated in dashed lines. Microprocessor 18 also provides each frame of data for encoding, interleaving and spreading as discussed above. Filters 42 and 44 are responsive to the rate indication for scaling the filter coefficients.

Figure 17:
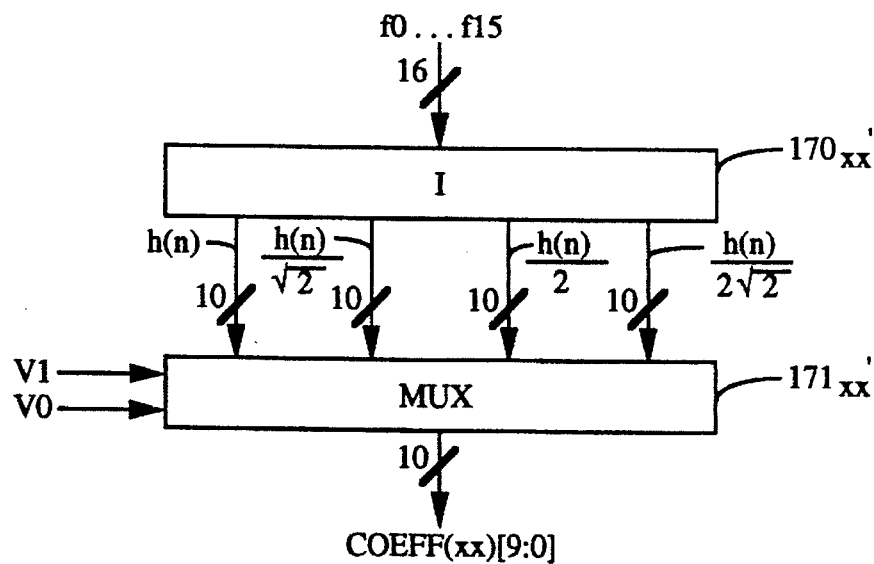
FIG. 17 is a diagram illustrating an exemplary alternative implementation of the interconnect logic circuit of the FIR filter of FIG. 14.

In FIG. 17, a modified version of the interconnect logic circuits 170 of FIG. 14 is illustrated which generates the scaled coefficient values h(n) for the various frame data rates. Interconnect login 170$_{xx}$' generates four 10-bit coefficient values h(n), h(n)/$\sqrt{2}$, h(n)/$2\sqrt{2}$ and h(n)/$2\sqrt{2}$. Each of the four coefficient values are provided as an input to multiplexer 171$_{xx}$'. Also provided to multiplexer 171$_{xx}$' are the rate indications bits $V_1$ and $V_0$. The values of bit $V_1$ and $V_0$ for the various rates are in accordance with Table IV. For a full rate frame, multiplexer $171_{xx}'$ provides as an output the 10-bit coefficient value h(n). Similarly for half, quarter and eighth rate frames, multiplexer $171_{xx}'$ respectively provides as an output the 10-bit coefficient values $h(n)/\sqrt{2}$, $h(n)/2$ and $h(n)/2\sqrt{2}$.

As disclosed in the above mentioned copending parent application in base station to mobile station communications the data is repeated throughout the frame in a manner similar to that discussed above. Although the modulation is slightly different, i.e. data intended for a each particular mobile station is encoded with a particular Walsh spreading code rather than symbol groups as in the mobile station transmission, the data is still convolutionally encoded, block interleaved, user PN scrambled and I and Q channel PN spread in a manner similar to the mobile station. The base station is also configured with a separate channel for communicating with a respective mobile station and also has separate control channels. However the basic teaching of the above techniques are applicable to either base station or mobile station communications.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for providing a filtered information signal in a transmission signal gated transmitter comprising:
   gating means for receiving an information signal and a predefined filter mask signal for use in masking out portions of said information signal, and for selecting portions of said information signal for transmission as a gated information signal in response to said filter mask signal; and
   filtering means for receiving and filtering said gated information signal using a predetermined filter format.

2. The apparatus of claim 1 wherein said filter means is an FIR filter.

3. The apparatus of claim 1 wherein said filter means is a retimed FIR filter.

4. The apparatus of claim 1 wherein said filter means is responsive to filter coefficients having values that vary on a cyclic basis.

5. The apparatus of claim 4 further comprising a filter coefficient generator means for generating said cyclically varying filter coefficients.

6. The apparatus of claim 5 wherein said filter coefficient generator means comprises:
   counter means for counting to a predetermined maximum value on a cyclic basis;
   sequence generator means for generating a sequences in response to said count values; and
   sequence selector means for selecting ones of said sequences and combining said selected sequences to provide said filter coefficients.

7. The apparatus of claim 6 wherein said sequence generator means comprises a plurality of Boolean operator functions.

8. The apparatus of claim 7 wherein said sequence selector means further comprises a twos complement means for providing twos complement representations of said cyclically varying filter coefficients.

9. The apparatus of claim 1 wherein said filter means is a retimed FIR filter oversampled by n times, where n is an integer.

10. The apparatus of claim 1 wherein said gating means comprises an AND gate for receiving said information signal and said mask signal.

11. An apparatus for providing a filtered information signal in a transmission signal gated transmitter comprising:
    a signal gate having a first input for receiving an information signal and a second input for receiving a filter mask signal for masking out portions of said information signal, and having an output for providing a gated information signal by selecting portions of said information signal in response to said filter mask signal; and
    a filter having an input for receiving said gated information signal and an output for providing a filtered signal.

12. The apparatus of claim 11 wherein said filter is an FIR filter.

13. The apparatus of claim 11 wherein said filter is a retimed FIR filter.

14. The apparatus of claim 11, wherein said filter has a second input for receiving filter coefficients having values that vary on a cyclic basis.

15. The apparatus of claim 14 further comprising a filter coefficient generator having an output for providing said cyclically varying filter coefficients.

16. The apparatus of claim 15 wherein said filter coefficient generator comprises:
    a counter having an output for providing count values over a predetermined repeated cycle so as to provide cyclic count values;
    a sequence generator having an input coupled to said counter output and having an output for providing sequences one in response to each cyclic count value; and
    a sequence selector having an input for receiving said sequences, being configured to select and combine ones of said sequences to provide said filter coefficients.

17. The apparatus of claim 16 wherein said sequence generator comprises a plurality of Boolean operator functions.

18. The apparatus of claim 17 wherein said sequence selector further comprises a twos complement generator having an input for receiving said cyclically varying filter coefficients and having an output.

19. The apparatus of claim 11 wherein said filter is a retimed FIR filter oversampled by n times, where n is an integer.

20. The apparatus of claim 11 wherein said signal gate comprises an AND gate having a first input for receiving said information signal and having a second input for receiving said filter mask signal.

21. A method for providing a filtered information signal in a transmission signal gated transmitter comprising the steps of:
    receiving an information signal;
    receiving a predefined filter mask signal for use in masking out portions of a signal;
    selecting portions of said information signal for transmission as a gated information signal in response to said filter mask signal; and
    filtering said gated information signal in accordance with a bandlimiting filter format.

22. The method of claim 21 wherein said step of filtering is FIR filtering.

23. The method of claim 21 wherein said step of filtering is provided by a retimed FIR filter.

24. The method of claim 21 wherein said step of filtering is responsive to filter coefficients having values that vary on a cyclic basis.

25. The method of claim 24 further comprises the step of generating said cyclically varying filter coefficients.

26. The method of claim 25 wherein said step of generating said filter coefficients comprises the steps of:

providing count values over a predetermined repeated cycle so as to provide cyclic count values;

generating sequences one in response to each cyclic count value; and selecting ones of said sequences in accordance with a predetermined selection format;

combining said selected sequences to provide said filter coefficients having values that vary on a cyclic basis.

27. The method of claim 26 wherein said step of generating said cyclically varying filter coefficients comprises generating sets of Boolean combinations of said cyclic count.

28. The method of claim 27 wherein said step of combining said sequences further comprises generating twos complement representations of said cyclically varying filter coefficients.

29. The method of claim 21 wherein said step of filtering is provided by a retimed FIR filter oversampled by n times, where n is an integer.

30. The method of claim 21 wherein said step of gating comprises providing said information signal and said mask signal to an AND gate.

31. A FIR filter with variable spectral response comprising:

counter means for counting to a predetermined maximum value on a cyclic basis;

sequence generator means for receiving said counter means count and generating a plurality of sequences in accordance with said count;

sequence selector means for selecting ones of said plurality of sequences and for combining said selected sequences to provide said filter coefficients; and filtering means for receiving an information signal and filtering said information signal using said filter coefficients.

32. The apparatus of claim 31 wherein said sequence generator means comprises a plurality of Boolean operator functions.

33. The apparatus of claim 31 wherein said sequence selector is further for generating twos complement representations of said cyclically varying filter coefficients.

34. A FIR filter with variable spectral response comprising:

a coefficient generator having an output for providing a set of filter coefficients having values that vary on a cyclic basis comprising:

a counter having an output for providing count values over a predetermined repeated cycle so as to provide cyclic count values;

a sequence generator having an input for receiving said cyclic count and having an output for providing a plurality of sequences in accordance with said cyclic count values; and a sequence selector having an input coupled to said sequence generator output, being configured to select and combine ones of said plurality of sequences, and having an output for providing said varying filter coefficients; and a filter having a first input for receiving an information signal and a second input for receiving varying filter coefficients, and having an output for providing a filtered information signal.

35. The apparatus of claim 34 wherein said sequence generator comprises a plurality of Boolean gates.

36. The apparatus of claim 34 wherein said sequence selector output is further for providing twos complement representations of said cyclically varying filter coefficients.

37. A method for filtering an information signal with variable spectral response comprising the steps of:

providing count values over a predetermined repeated cycle so as to provide cyclic count values;

generating a plurality of sequences one in accordance with each cyclic count value;

selecting ones of said plurality of sequences;

combining said selected sequences to provide filter coefficients having values that vary on a cyclic basis; and filtering said information signal using said filter coefficients.

38. The method of claim 37 wherein said step of generating a plurality of sequences comprises performing a plurality of Boolean functions.

39. The method of claim 37 wherein said step of combining said selected sequences further comprises generating twos complement representations of said cyclically varying filter coefficients.

* * * * *